United States Patent
Tillotson et al.

(10) Patent No.: US 9,464,938 B2
(45) Date of Patent: Oct. 11, 2016

(54) SYSTEMS AND METHODS FOR MEASURING POLARIZATION OF LIGHT IN IMAGES

(71) Applicant: The Boeing Company, Chicago, IL (US)

(72) Inventors: Brian J. Tillotson, Kent, WA (US); Jennifer K. Baerny, Seattle, WA (US)

(73) Assignee: The Boeing Company, Chicago, IL (US)

( * ) Notice: Subject to any disclaimer, the term of this patent is extended or adjusted under 35 U.S.C. 154(b) by 413 days.

(21) Appl. No.: 14/174,652

(22) Filed: Feb. 6, 2014

(65) Prior Publication Data
US 2015/0219498 A1 Aug. 6, 2015

(51) Int. Cl.
G01J 4/04 (2006.01)
B64D 47/08 (2006.01)
G01J 3/02 (2006.01)
G01J 3/28 (2006.01)

(52) U.S. Cl.
CPC ............... *G01J 4/04* (2013.01); *B64D 47/08* (2013.01); *G01J 3/0224* (2013.01); *G01J 3/0237* (2013.01); *G01J 3/2823* (2013.01); *G01J 2003/2826* (2013.01)

(58) Field of Classification Search
None
See application file for complete search history.

(56) References Cited

U.S. PATENT DOCUMENTS

| 7,085,622 | B2 | 8/2006 | Sadighi et al. | |
|---|---|---|---|---|
| 2003/0043375 | A1 | 3/2003 | Opsal | |
| 2004/0056966 | A1* | 3/2004 | Schechner | G06T 7/0018 348/229.1 |
| 2007/0051890 | A1 | 3/2007 | Pittman | |
| 2007/0244608 | A1* | 10/2007 | Rath | G05D 1/0038 701/3 |
| 2011/0290937 | A1* | 12/2011 | Salkeld | B64C 17/04 244/80 |
| 2014/0064720 | A1* | 3/2014 | Chapman | F16M 11/10 396/428 |

FOREIGN PATENT DOCUMENTS

| CN | 1451230 A | 10/2003 |
|---|---|---|
| CN | 1653326 A | 8/2005 |

OTHER PUBLICATIONS

Canadian Office Action dated Feb. 26, 2016 in Canadian Patent Application No. 2,870,718 (Canadian counterpart of the instant U.S. patent Application).
Tonizzo et al., "Polarized light in coastel waters: hyperspectral and multiangular analysis", Optics Express, vol. 17, No. 7, Mar. 30, 2009.

(Continued)

*Primary Examiner* — Sath V Perungavoor
*Assistant Examiner* — Janese Duley
(74) *Attorney, Agent, or Firm* — Ostrager Chong Flaherty & Broitman P.C.

(57) ABSTRACT

Systems capable of acquiring polarimetry data using a single camera with or without a polarizing filter. When a polarizing filter is used, the data acquisition method comprises: (1) maneuvering the aircraft (or other vehicle) to orient the polarizing filter (and camera) in various directions when images are captured, (2) registering the various images to each other, and (3) computing polarimetry values (such as the Stokes parameters) for points of interest in the images. When a polarizing filter is not used, the data acquisition method comprises maneuvering the aircraft (or other vehicle) to orient the camera in various directions when images are captured and then performing the same operations (2) and (3). These methods measure the amount of polarization in a given scene by taking multiple camera images at different angles.

28 Claims, 20 Drawing Sheets

(56) References Cited

OTHER PUBLICATIONS

Extended European Search Report dated Jul. 13, 2015, issued in European Application No. 15154228.9 (European counterpart of the instant application).

Chinese Office Action dated Jun. 28, 2016, Chinese Patent Application No. 201510064791.9 (Chinese counterpart to the instant patent application).

English Abstract of CN1451230A.

* cited by examiner

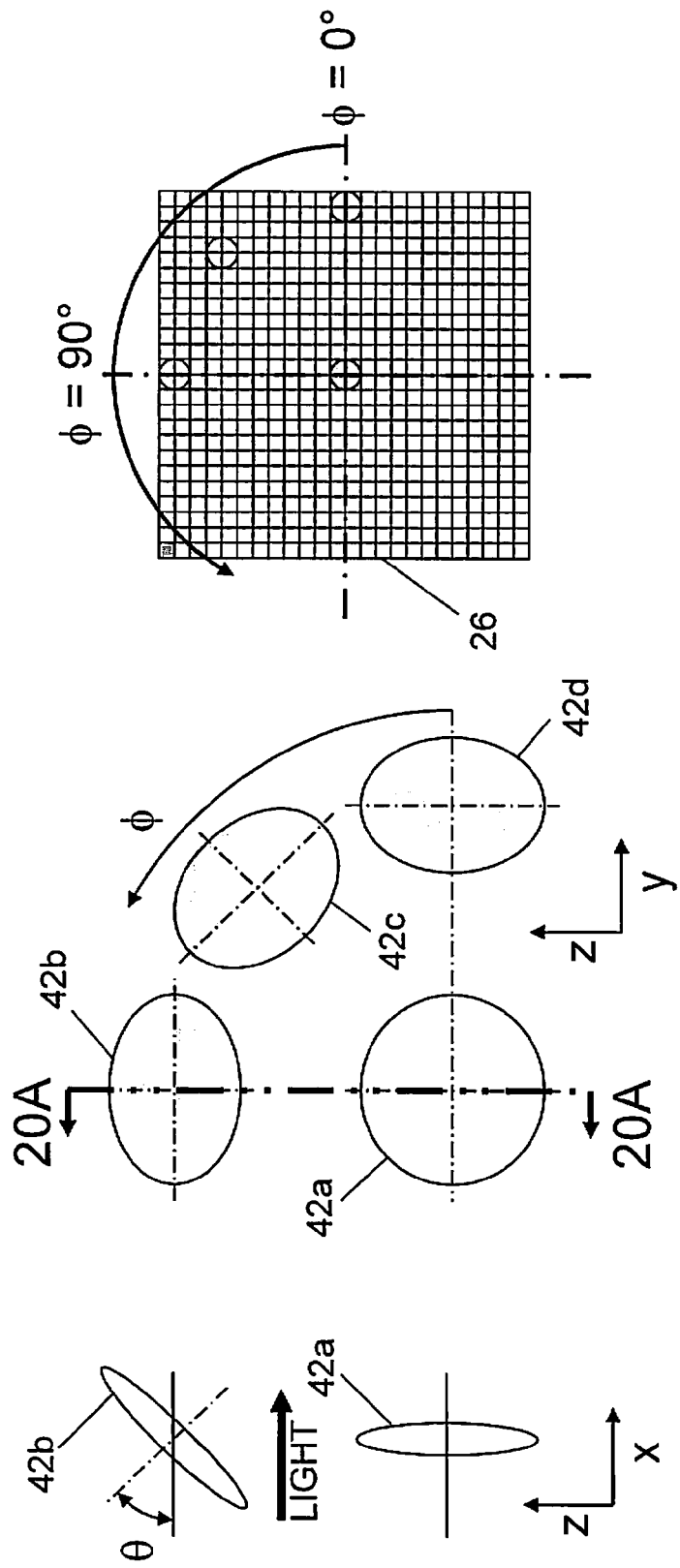

SYSTEMS AND METHODS FOR MEASURING POLARIZATION OF LIGHT IN IMAGES

BACKGROUND

This disclosure generally relates to systems and methods for measuring the polarization of light in images. In particular, this disclosure relates to the use polarization and polarimetry for visually detecting objects of interest. As used herein, the term "polarimetry" means the measurement and interpretation of the polarization of transverse waves, such as electromagnetic waves.

The general problem addressed herein is to improve systems and methods for measuring the polarization of light in images, specifically images captured by moving vehicles. Polarization and polarimetry can help users detect many objects of interest. For example, in a natural scene full of unpolarized light, smooth surfaces appear as linearly polarized light; those smooth surfaces often correspond to artifacts such as weapons or downed aircraft (which are frequently sought by the military) or foreign object damage (which most vehicle operators try to avoid). Polarization lets surveillance analysts' vision penetrate haze or the glare from surfaces like water or windows. Polarization enables military analysts to find submarines and mines or spot snipers hiding behind windows, and enables fishermen to find schools of fish. Polarization may also help civilian users measure weather parameters or assess the health of forests and crops.

Despite these benefits, polarimetry and polarized imagery are rarely used. The reasons are cost, weight, and reliability. In general, it is not sufficient to put a single polarizing filter in front of a single camera. To measure polarization in an image and discern which parts of the image have different polarization than other parts, one must capture an image with at least two and usually three orientations of a polarizing filter. In prior art, this has meant: (1) an electrically controlled rotating filter mounted to a camera lens, (2) an electrically controlled filter wheel with several polarizing filters mounted at different angles, or (3) multiple cameras, each with a differently oriented polarizing filter. The cost, weight, and reliability penalties of these approaches have precluded most uses of polarimetry for images taken outside a laboratory.

In the case of an electrically controlled rotating filter mounted to a camera lens, a filter wheel is configured to position polarizing filters with three or four different orientations in front of a single camera. A filter wheel is a fairly robust optical component with moving parts. It is about as heavy as a small camera used on a typical unmanned aerial vehicle (UAV). It occupies substantial volume. Having an electromechanical actuator, it is substantially less reliable than a digital camera and therefore reduces the reliability of an aircraft mission system.

A rotating polarizer in front of a single camera is smaller than a filter wheel, but is still a robust optical component with moving parts. It substantially increases the weight of a small camera and may substantially increase its volume. It contains an electromechanical actuator, which reduces the reliability of an aircraft mission system.

In the third case, a system comprising multiple cameras facing the same direction, each with a differently oriented polarizer in front of it, imposes a small penalty to cost, weight, and reliability for each camera. However, using three or four cameras instead of one increases cost and weight and decreases reliability of the system.

In accordance with a further development, differently oriented polarizing filters are placed in front of various pixels in a charge-coupled device (CCD). Such a camera would produce a digital image structured like a three- or four-color picture, but each "color" would correspond to the intensity of a different polarization. It is not clear that a pixel-by-pixel polarizing filter can be made economically. The camera does not allow actual color imaging (e.g., red, blue, and green) concurrent with the polarimetry. One such CCD chip is designed to output four "colors" (one for each polarization) rather than the usual three expected by image file formats. This poses technical and economic barriers to widespread acceptance.

It would be desirable to provide improved means and methods for collecting visual polarimetry data from a moving vehicle (e.g., an aerial vehicle) with an optimal combination of low cost, low weight, and low reliability penalty.

SUMMARY

The subject matter disclosed comprises systems capable of acquiring polarimetry data using a single camera with or without a polarizing filter. When a polarizing filter is used, the data acquisition method comprises: (1) maneuvering the aircraft (or other vehicle) to orient the polarizing filter (and camera) in various directions when images are captured, (2) registering the various images to each other, and (3) computing polarimetry values (such as the Stokes parameters) for points of interest in the images. When a polarizing filter is not used, the data acquisition method comprises maneuvering the aircraft (or other vehicle) to orient the camera in various directions when images are captured and then performing the same operations (2) and (3) in a computer system. These methods measure the amount of polarization in a given scene by taking multiple camera images at different angles.

One aspect of the subject matter disclosed herein is a method for determining the polarization of a scene, comprising: (a) placing a linear polarizing filter in the field of view of a camera comprising a lens and an array of sensors; (b) successively locating the camera and the linear polarizing filter in proximity to a single position, but at three different orientations for each of which a scene is within the field of view of the camera; (c) capturing first through third filtered images while the camera and the linear polarizing filter are at the three different orientations respectively; (d) transferring first through third sets of imaging data respectively representing the first through third filtered images from the camera to a computer system; and (e) computing a polarization of at least one point in the scene from the first through third sets of imaging data. The method may further comprise mounting the camera and the linear polarizing filter on a vehicle, wherein step (b) comprises maneuvering the vehicle, and/or registering the first through third sets of imaging data with respect to each other before performing step (e). In the disclosed embodiment, step (e) comprises computing Stokes parameters.

Another aspect of the subject matter disclosed herein is a system for acquiring images of a scene, comprising: an unmanned vehicle; a camera onboard the unmanned vehicle, the camera comprising a lens and an array of sensors; a first linear polarizing filter disposed in front of at least a first portion of the array of sensors; an unmanned vehicle control system capable of controlling the unmanned vehicle to perform maneuvers, the unmanned vehicle control system comprising hardware and software, the software of the unmanned vehicle control system being configured to control the unmanned vehicle to position itself at or near a specified position for each of first, second and third occurrences and at first, second and third orientations which are different than each other, but which each place the scene within the field of view of the camera; and a camera control system disposed onboard the unmanned vehicle and capable of controlling the camera to capture images, the camera control system comprising hardware and software, the software of the camera control system being configured to control the camera to capture first, second and third images of a target scene during the first, second and third occurrences respectively and then outputting first, second and third sets of imaging data respectively representing the first, second and third images. The system may further comprise an imaging data processing system capable of processing imaging data, the imaging data processing system comprising hardware and software, the software of the imaging data processing system being configured to register the first, second and third sets of imaging data with respect to each other and compute polarization values for the imaged scene.

A further aspect is a method for determining the polarization of a scene, comprising: (a) characterizing the polarizing power of a camera comprising a lens and an array of sensors; (b) successively locating the camera in proximity to a single position, but at three different orientations for each of which a scene is within the field of view of the camera; (c) capturing first through third images while the camera is at the three different orientations respectively; (d) transferring first, second and third sets of imaging data representing the first through third captured images from the camera to a computer system; and (e) computing a polarization of at least one point in the scene from the first, second and third sets of imaging data. In the disclosed embodiments, step (a) comprises determining first and second Mueller matrix elements.

Another aspect is a system for acquiring images of a scene, comprising: an unmanned vehicle; a camera onboard the unmanned vehicle, the camera comprising a lens and an array of sensors; an unmanned vehicle control system capable of controlling the unmanned vehicle to perform maneuvers, the unmanned vehicle control system comprising hardware and software, the software of the unmanned vehicle control system being configured to control the unmanned vehicle to position itself at or near a specified position for each of first, second and third occurrences and at first, second and third orientations which are different than each other, but which each place the scene within the field of view of the camera; and a camera control system disposed onboard the unmanned vehicle and capable of controlling the camera to capture images, the camera control system comprising hardware and software, the software of the camera control system being configured to control the camera to capture first, second and third images of a target scene during the first, second and third occurrences respectively and then outputting first, second and third sets of imaging data respectively representing the first, second and third images. The system may further comprise an imaging data processing system capable of processing imaging data, the imaging data processing system comprising hardware and software, the software of the imaging data processing system being configured to register the first, second and third sets of imaging data with respect to each other and compute polarization values for the imaged scene based in part on stored data representing a characterization of the polarizing power of the camera.

Yet another aspect is a method for measuring polarization in light from a scene, comprising: (a) capturing successive images of a scene using a camera positioned in proximity to a single position and oriented at successive different orientation angles, wherein a set of matrices characterizing a polarizing power of the camera at different angles of incidence and different angles of orientation are known and there is no polarizing filter between an array of sensors of the camera and the scene; (b) registering the captured images with respect to each other; and (c) computing polarimetry values for light from at least one point of interest in the scene based on the registered captured images and the known matrices, wherein steps (b) and (c) are performed using a computer system comprising hardware and software.

A further aspect of the subject matter disclosed herein is an empirical method for characterizing a polarizing power of a camera having a lens and a focal plane array of sensors at a specified angle of incidence of impinging light and a specified orientation angle, the method comprising: (a) providing a target that emits unpolarized light; (b) aiming the camera at the target without an intervening polarizing filter and with a portion of the target projected onto sensors in the center of the focal plane array; (c) capturing a reference image while the camera is in the state described in step (b); (d) calculating a set of reference pixel values for a set of pixels in the reference image which are adjacent to a pixel produced by a sensor in the center of the focal plane array; (e) aiming the camera at the target without an intervening polarizing filter and with a portion of the target projected onto sensors near an edge or corner of the focal plane array; (f) capturing a first image while the camera is in the state described in step (e); (g) calculating a first set of pixel values for a set of pixels in the first image which are adjacent to a pixel produced by a sensor near the edge or corner of the focal plane array; (h) placing a linear polarizing filter between the camera and the target; (i) capturing a second image while the camera is in the state described in steps (e) and (h); (j) calculating a second set of pixel values for a set of pixels in the second image which are adjacent to the pixel produced by the sensor near the edge or corner of the focal plane array; (k) calculating a first element of a matrix based on the set of reference pixel values and the first set of pixel values; and (l) calculating a second element of the matrix based on at least the set of reference pixel values and the second sets of pixel values. The foregoing method may further comprise: (m) rotating the linear polarizing filter by 90°; (n) capturing a third image while the camera is in the state described in steps (e) and (m); and (o) calculating a third set of pixel values for a set of pixels in the third image which are adjacent to the pixel produced by the sensor near the edge or corner of the focal plane array, wherein in step (l), the second element of the matrix is calculated based on at least the set of reference pixel values and the second and third sets of pixel values. Furthermore, the empirical method may comprise computing an intensity coefficient based on the set of reference pixel values and the second and third sets of pixel values.

Compared to prior art solutions, the systems disclosed herein can provide one or more of the following benefits. (1) The disclosed systems can have lower weight, lower cost, and (because no moving parts are added to the aircraft) higher reliability because they have neither a filter wheel nor a rotating polarizer. (2) The disclosed systems can have lower weight and lower cost because it employs fewer cameras, and therefore has fewer electronic components and electrical connections, resulting in higher reliability. (3) In contrast to recent developments involving polarizing filters on a CCD, the disclosed systems require no development of new electronic fabrication processes, so the timeline and cost to make it available are better. Actual color imaging (e.g., red, blue, and green) is popular with users and is needed for some applications. The disclosed systems allow actual color imaging concurrent with polarimetry. Polarizing filters on a CCD do not allow this. The filter used in the systems disclosed herein is easy to remove in most embodiments, and therefore allows efficient unpolarized imaging with the same camera at the same resolution. Polarizing filters attached to a CCD are difficult or impossible to remove, so unpolarized imaging is only available with a second camera (costly) or by summing the intensities of neighboring pixels with different polarizations (lower photonic efficiency and lower resolution).

Other aspects of improved systems and methods for measuring the polarization of light in images are disclosed below.

BRIEF DESCRIPTION OF THE DRAWINGS

FIG. 20A is a diagram showing a sectional view of an untilted lens and a lens tilted at angle $\theta$. These lenses are sectioned along a plane indicated by line 20A-20A in FIG. 20B.

FIG. 20B is a diagram showing front views of the lenses depicted in FIG. 20A and other lenses tilted at different orientations $\phi$.

FIG. 20C is a diagram representing object images projected onto a focal plane array mounted coaxially with the lenses depicted in FIG. 20B. The angle $\phi$ corresponds to angular position about the center of the focal plane.

Reference will hereinafter be made to the drawings in which similar elements in different drawings bear the same reference numerals.

DETAILED DESCRIPTION

Figure 1:
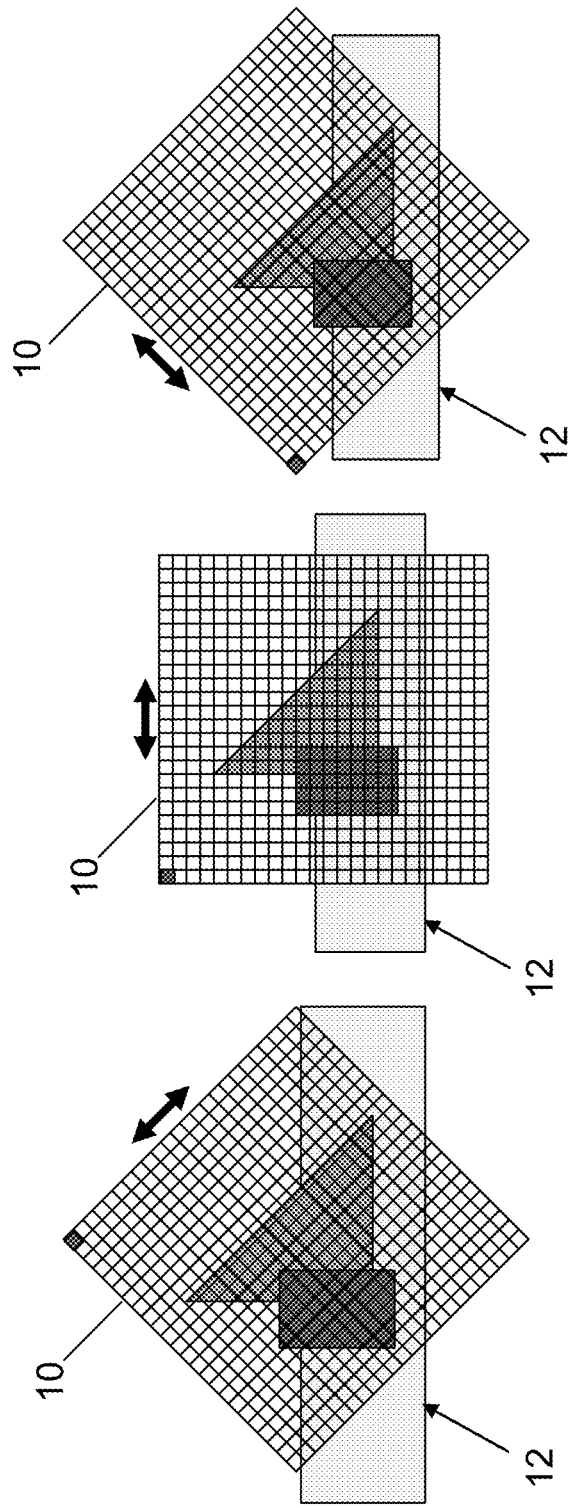
FIGS. 1A, 1B and 1C are diagrams which respectively show a camera pixel grid overlying a target scene at respective orientations as the aircraft maneuvers to orient the camera. The dark spot at a corner of the camera pixel grid marks the same pixel in all images. The two-headed arrows indicate respective polarization angles corresponding to respective linear polarizing filter orientations.

Various embodiments will be described for the purpose of illustrating various applications of the principles taught herein. Although the embodiments shown in the drawings and described in detail below involve mounting a camera on an aircraft (e.g., a fixed-wing aircraft such as a UAV or a rotary-wing aircraft such as a helicopter), it should be appreciated at the outset that the principles taught herein can also be applied to spacecraft and unmanned underwater vehicles (UUVs).

In accordance with some embodiments, the system for acquiring polarization values for an imaged target comprises: an aircraft; an onboard navigation and control system capable of flying to a three-dimensional position (e.g., longitude, latitude and altitude) and later returning the aircraft to approximately the same position at least twice, and also capable of measuring the aircraft orientation at the position and setting the aircraft in a different selected orientation when it returns to the same position; an onboard camera having a known orientation with respect to the aircraft; an onboard linear polarizing filter having a known, fixed orientation with respect to the camera; an onboard control system capable of controlling the camera to capture images when the aircraft arrives at the selected position with one of the selected orientations; a computer (onboard or on the ground) programmed to register the images and compute polarization values for the imaged target; and means for transferring camera images to the computer.

For those embodiments having a camera and a polarizing filter mounted on a fixed-wing aircraft that cannot hover at a position while taking a series of images, the major process steps comprise: (a) flying the aircraft toward a position from which a target is in the camera's field of view; (b) before arriving at the position, orienting the aircraft to a first aircraft orientation corresponding to a first filter orientation about the line of sight to the target; (c) capturing a first image of the target while the aircraft is at the position and in the first aircraft orientation; (d) flying the aircraft toward the same position again; (e) before arriving at or near the position a second time, orienting the aircraft to a second aircraft orientation corresponding to a second filter orientation about the line of sight to the target; (f) capturing a second image of the target while the aircraft is at or near the position and in the second aircraft orientation; (g) flying the aircraft toward the same position again; (h) before arriving at or near the position a third time, orienting the aircraft to a third aircraft orientation corresponding to a third filter orientation about the line of sight to the target; (i) capturing a third image of the target while the aircraft is at or near the position and in the third aircraft orientation; (k) transferring the image data and data defining the three orientations to a computer; (l) performing calculations to geometrically register the images to each other; and (m) calculating polarization parameters, such as the Stokes parameters, for the image of the target. Although it is preferred that the camera be in precisely the same position during each pass of the aerial vehicle at different camera orientations, a person skilled in the art of aerial vehicles will recognize that such precision is dependent on the accuracy of the positioning system used, wind conditions and other factors.

Before describing any system in detail, it may be helpful to consider why the polarizer typically has three different orientations relative to the target. Consider partially polarized light arriving from some target. Assume for the moment that the circular polarization is zero, so that only linear polarization is of interest. The system user wants to know how much of the light from the target is polarized and how much is unpolarized, and what is the orientation of the polarized light.

To resolve the foregoing issues, one can first measure the intensity of light at one polarization angle. Assume that the angle is vertical and call it angle zero. Assume that an intensity of one unit is measured. One can then measure the intensity at a polarization angle of 90°, i.e., horizontal polarization. That intensity is also one unit. With these two measurements, one cannot determine whether the light is (1) completely unpolarized with intensity of two units, (2) polarized at 45° with intensity of two units, or (3) polarized at 135° with intensity of two units. This is a general problem: two measurements are never sufficient, regardless of the two angles one chooses. To resolve the ambiguity, a third measurement is made, preferably at a polarization angle of 45° or 135°. Assume that one uses 45°. If an intensity of zero is measured, that indicates the light is 100% polarized at 135°. If an intensity of two units is measured, that indicates the light is 100% polarized at 45°. If an intensity of one unit is measured, that indicates the light is 100% unpolarized. Various non-integer values between zero and two units indicate the fractional polarization and the angle of the polarized part.

There are cases where information about the target scene allows one to eliminate one measurement. For example, if there is only a single, unpolarized light source illuminating a convex object made of optically isotropic material, then the only two orientations needed to measure optical intensity are the orientation parallel to a patch of the object's surface and the orientation perpendicular to that patch. There cannot be any light polarized at 45° relative to the surface. But such cases are rare: for most applications, one needs to measure intensity at three different orientations. These orientations do not need to be separated by odd and even integer multiples of 45°, but the associated mathematics is easiest if they are.

Persons skilled in the art know that polarization is not only linear, but also includes circular components. Most of the embodiments disclosed in detail herein ignore circular polarization for the purpose of simplification with little cost in utility. Circular polarization is rare. Even when it occurs, it is usually quite weak unless steps have been taken to produce circularly polarized light.

There are several equivalent ways to mathematically describe a given state of polarization. One of these descriptions uses four parameters called the Stokes parameters. This description is easiest to relate to a set of intensity measurements at various angles, so Stokes parameters are referred to in this disclosure. The Stokes parameters are often collected together in a four-element vector called the Stokes vector.

The fourth Stokes parameter is a measure of circular polarization. Since the embodiments disclosed herein largely neglect circular polarization, this disclosure focuses on the first three Stokes parameters. The terms "Stokes parameters" and "Stokes vector" used herein typically mean only the first three parameters or a three-element vector of those parameters, respectively.

The four Stokes parameters are labeled I, Q, U, and V. The first three are calculated from intensity measurements as follows:

$$I = Int_0 + Int_{90} = Int_{45} + Int_{135} \quad (1)$$

$$Q = Int_0 - Int_{90} \quad (2)$$

$$U = Int_{45} - Int_{135} \quad (3)$$

where $Int_0$, $Int_{45}$, $Int_{90}$, and $Int_{135}$ are the intensities measured at angles indicated by the subscripts and measured in degrees. In the disclosed embodiments, the system makes only three measurements. One can calculate any intensity value from the other three, e.g., given $Int_0$, $Int_{45}$, and $Int_{90}$, one can use the right-hand side of Eq. (1) to calculate $Int_{135}$:

$$Int_{35} = Int_0 + Int_{90} - Int_{45} \quad (4)$$

Once the Stokes parameters are calculated based on angles relative to the camera, they can be mathematically transformed to describe polarization in terms of any other frame of reference.

Despite the use of the term "Stokes parameters" in this disclosure, it should be appreciated that the calculations used to determine polarization values are not limited to using only Stokes parameters, i.e., they may be based on any mathematical representation of polarization.

The methodology disclosed herein involves the acquisition of polarimetry data from a target using a camera mounted on a vehicle and processing the acquired data using a suitably programmed computer system. The camera has a polarizing filter attached so that the filter has a fixed position relative to the camera lens.

FIGS. 1A, 1B and 1C show a camera pixel grid 10 overlying a target scene 12 at respective orientations as the aircraft maneuvers to orient the camera. In this example, the respective polarization angles (indicated by two-headed arrows) are +45° (FIG. 1A), 0° (FIG. 1B) and −45° (FIG. 1C). The dark spot at a corner of the camera pixel grid 10 marks the same pixel in all images.

Figure 2:
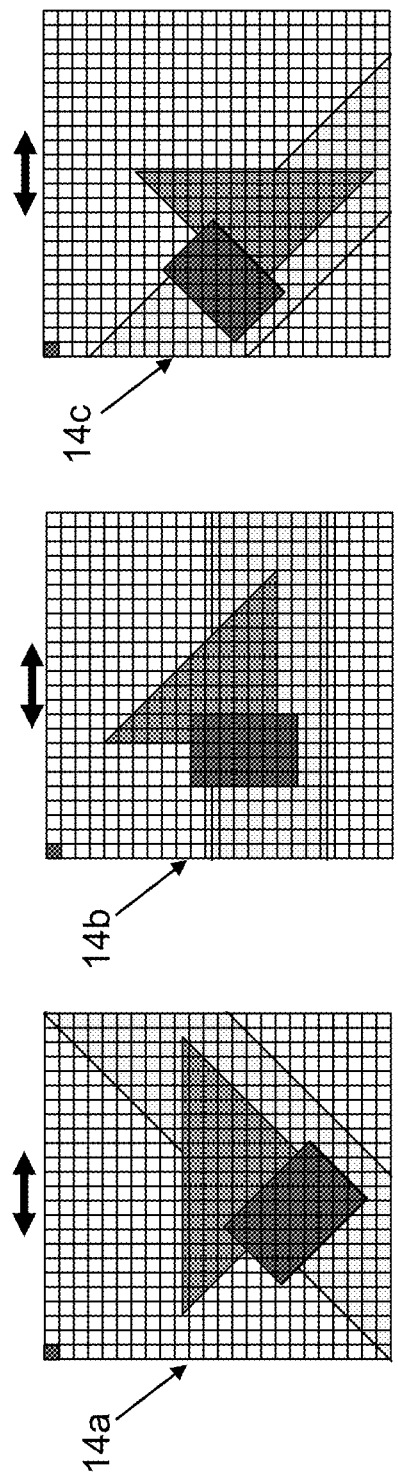
FIGS. 2A, 2B and 2C show images that will captured in the instances respectively shown in FIGS. 1A, 1B and 1C.

FIGS. 2A, 2B and 2C show images captured in the instances respectively shown in FIGS. 1A, 1B and 1C. The relatively lightly shaded triangle and the relatively darkly shaded rectangle which partly overlies the triangle represent idealized features of a target object at the target scene 12. Again the respective polarization angles are indicated by two-headed arrows.

After the polarimetry data has been acquired, that data is transferred to a computer system for data processing. Referring to FIGS. 2A-2C, the grayscale value at each pixel is proportional to the intensity of polarized light having the orientation shown for the respective image. To determine the Stokes vector for a given point in a scene, the computer performs calculations using intensity values for the pixels that correspond to the same point in the scene—at least one from each of three images, using the formulae from Eqs. (1)-(4). The process of aligning pixels across two or more images will be referred to herein as "image registration".

Many methods for image registration are well known in the art. In accordance with the systems disclosed herein, data about the position and orientation of the camera is usually available for every image. Therefore, image registration methods that exploit such data are typically preferred.

Figure 3:
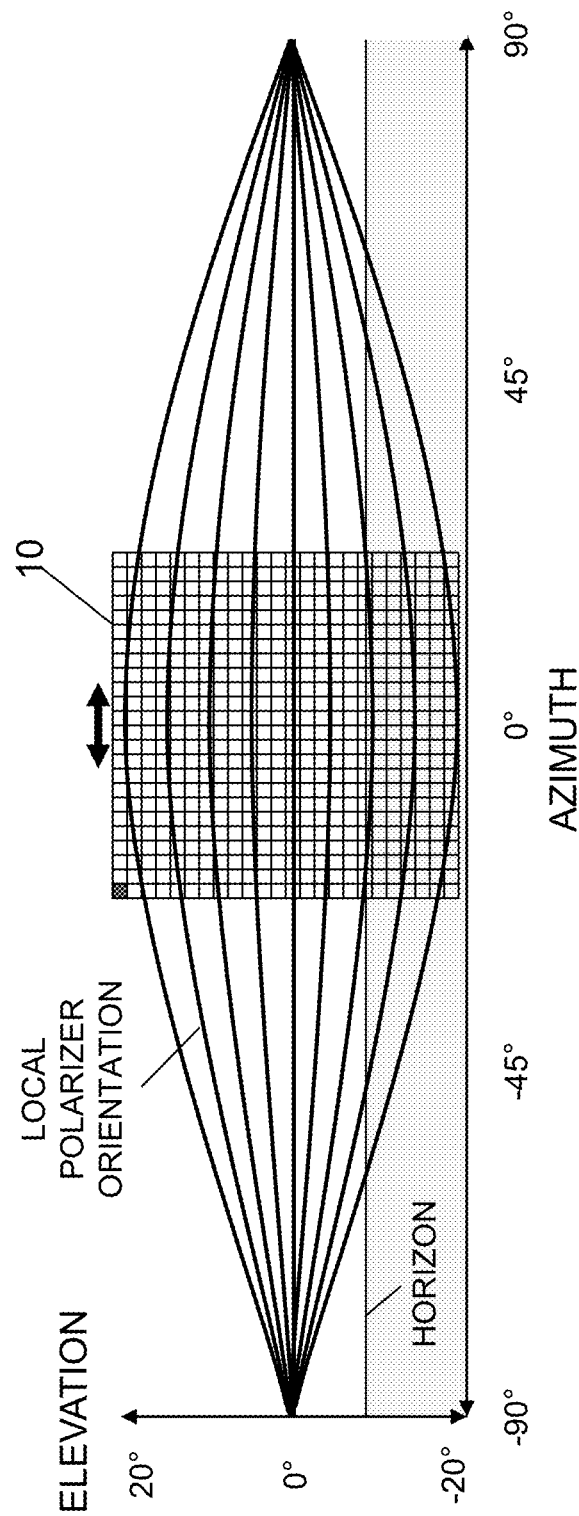
FIG. 3 is a graph depicting the fact that perspective distorts polarizer orientation for pixels not at the center of an image.

To this point in the disclosure, polarizer orientation has been discussed as if it were constant across the image. It is not, as illustrated in FIG. 3, which graphically depicts the fact that perspective distorts polarizer orientation for pixels not at the image center. The vertical axis is elevation, while the horizontal axis is azimuth. This graph illustrates the effect of placing a flat polarizing filter (not shown in FIG. 3) with horizontal orientation in front of a camera lens (not shown). The polarization angle is indicated by a two-headed arrow. The thick curved lines labeled "local polarizer orientation" show the resulting polarization at each point in an image. Along the vertical axis of the image, polarization is horizontal. Likewise along the horizontal axis of the image, polarization is horizontal. However, if one were to envision a polarizer extending infinitely far to the left and right, and a camera able to form an image that spans 180° of azimuth, one sees the lines of "horizontal" polarization distorted by optical perspective. At the extreme left and right, the lines "vanish" at optical infinity. Between the center of the image and the edge of the image, the local orientation of the polarizer through which light travels to the camera focal plane is not horizontal. The horizon line in FIG. 3 shows local horizontal at each azimuth position. (It has been assumed that this image was taken at high altitude so the limb of the Earth is below the zero-elevation line.) The local horizontal is not parallel with the polarizer orientation. For any image more than a few degrees wide, the deviation is significant and must be dealt with mathematically.

Methods to calculate the actual polarizer orientation at each point in an image are well known in the art. The process step called "calculating polarization parameters" herein applies one or more of these methods.

Systems and methods using a polarizing filter for measuring the polarization of light in an image in accordance with the principles disclosed herein can be embodied many ways. Various examples of suitable embodiments will now be described in detail.

First Embodiment

Figure 4A:
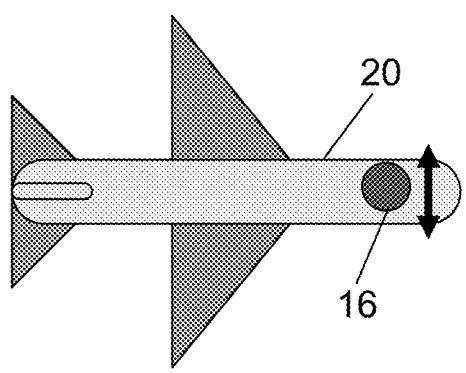
FIGS. 4A and 4B are diagrams representing top and side views of an idealized fixed-wing aircraft having a downward-facing camera.
Figure 4B:
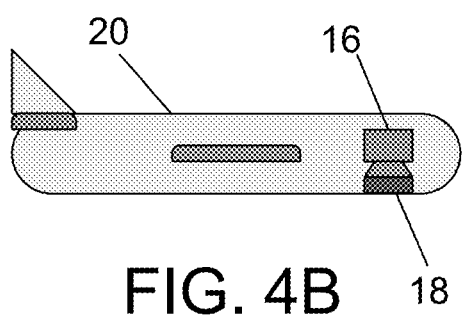

FIGS. 4A and 4B are top and side views of an idealized fixed-wing aircraft 20 having a single downward-facing camera 16 fixedly mounted thereto. A polarizing filter 18 is mounted in such a way that it has a fixed position relative to the camera and is disposed in front of the camera lens (not shown). The polarization angle is indicated by a two-headed arrow in FIG. 4A.

Figure 5:
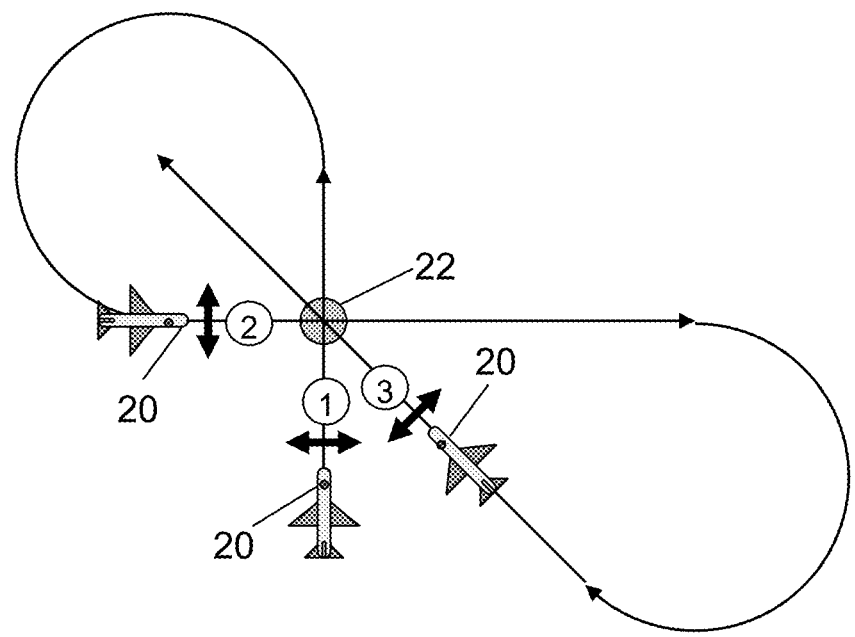
FIG. 5 is a diagram showing a flight path for the fixed-wing aircraft shown in FIGS. 4A and 4B, which flight path involves changes in heading to orient a polarizing filter mounted to the camera during three successive passes over a target.

FIG. 5 shows a flight path for the fixed-wing aircraft 20 shown in FIGS. 4A and 4B, which flight path involves changes in heading to orient the polarizing filter during three successive straight passes over a target 22. The successive passes are indicated by encircled numbers 1, 2 and 3 respectively. The polarization angles for the three passes are indicated by respective two-headed arrows in FIG. 5.

As seen in FIG. 5, the aircraft can fly along a path having a criss-cross pattern to capture images with different filter orientations from the same target scene. (Other flight paths can be employed provided that the polarizing filter 18 will be oriented along three directions that differ by at least one odd multiple of 45° and one even multiple of 45°.)

Second Embodiment

In accordance with an alternative embodiment, a downward-pointing camera with a polarizing filter in a fixed position can be mounted on a rotorcraft. Because a rotorcraft is able to hover in one place, the rotorcraft pilot can position the rotorcraft at one position with the target in the camera's field of view and then hover at that position. While the rotorcraft is hovering, the pilot can cause the rotorcraft to yaw as three images are captured by the camera at different yaw angles, thereby orienting the polarizing filter in three directions while capturing the three images.

Third Embodiment

Figure 6B:
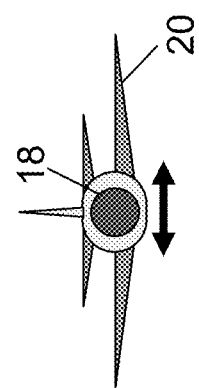
FIGS. 6A and 6B are diagrams representing side and front views of an idealized fixed-wing aircraft having a forward-facing camera with polarizing filter.
Figure 6A:
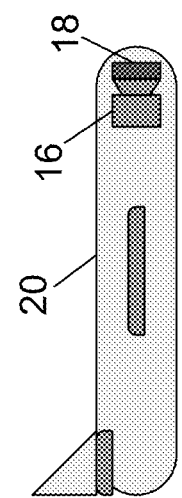

In accordance with another embodiment, an aircraft with a single camera pointed forward or aft uses bank angles to achieve different polarizing filter orientations. FIGS. 6A and 6B are side and front views of an idealized fixed-wing aircraft 20 having a single forward-pointing camera 16 fixedly mounted thereto. A polarizing filter 18 is mounted in such a way that it has a fixed position relative to the camera and is disposed in front of the camera lens (not shown). The polarization angle is again indicated by a two-headed arrow in FIG. 6B.

Figure 7:
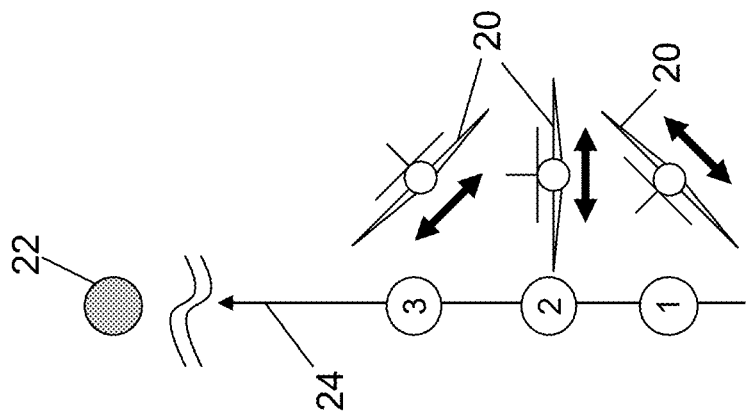
FIG. 7 shows a flight path for the fixed-wing aircraft 20 shown in FIGS. 6A and 6B, which flight path involves changes in bank angle to orient the forward-facing camera with polarizing filter during flight along a straight path (i.e., the line of sight) directed toward a target.

FIG. 7 shows a flight path for the fixed-wing aircraft 20 shown in FIGS. 6A and 6B, which flight path involves changes in bank angle to orient the polarizing filter during flight along a straight path 24 (i.e., the line of sight) directed toward a target 22. Successive aircraft positions along the line of sight are indicated by encircled numbers 1, 2 and 3 respectively. The corresponding bank angles of the aircraft 20 are shown to the right of each encircled number. The polarization angles for the three aircraft positions are indicated by respective two-headed arrows in FIG. 7.

For cases where the airplane can roll through 90° and take three images of the target with adequate resolution and without significant change in the line of sight to the target, the method shown in FIG. 7 is appropriate. The control system commands the plane to roll 45° to one side, commands the camera to take a picture, rolls level, takes another picture, rolls to the other side, and takes a third picture. Ideally, the second and third pictures occur at positions along the line of sight from the first image position to the target. This assures that the camera is sampling light with nearly the same scattering angle, and therefore the same polarization, in every image.

Figure 8:
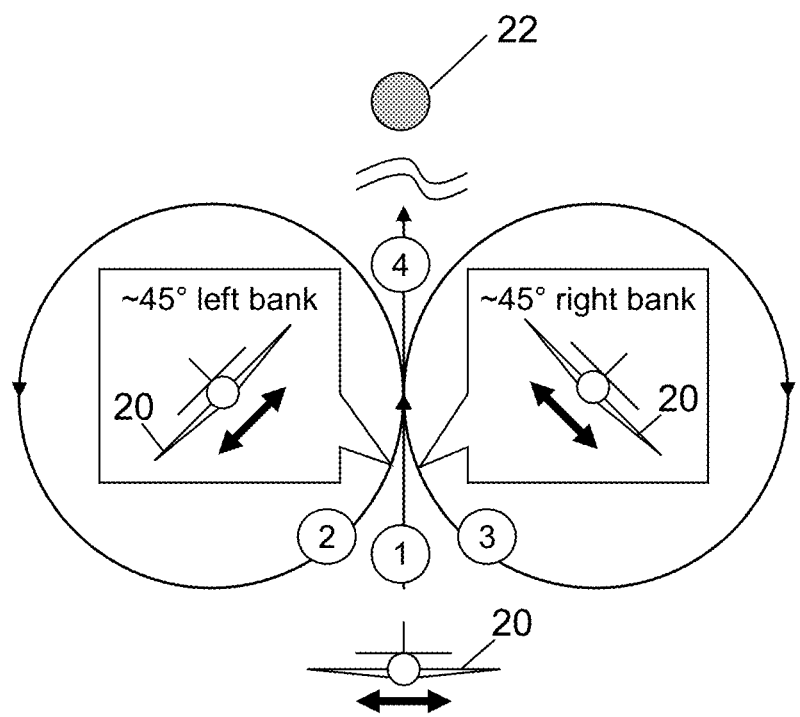
FIG. 8 is a diagram showing a flight path for the fixed-wing aircraft shown in FIGS. 6A and 6B, which flight path involves changes in heading and changes in bank angle to orient the forward-facing camera with polarizing filter during three successive passes through the same position lying along an initial line of sight to a target.

In cases needing more precision, or where smoke, dust, haze, etc. scatter a significant amount of light, the method of FIG. 8 is appropriate. FIG. 8 shows a flight path for the fixed-wing aircraft 20 shown in FIGS. 6A and 6B, which flight path involves changes in heading and changes in bank angle to orient the forward-facing camera 16 with polarizing filter 18 (see FIG. 6A) during three successive passes through the same position lying along an initial line of sight to a target 22. The successive legs of the flight path are indicated by encircled numbers 1, 2, 3 and 4 respectively. The first leg 1 is straight and collinear with the initial line of sight of the camera to the target 22. The aircraft 20 may have a bank angle of 0° when the first image of target 22 is captured by the onboard camera. After the first image is captured, the aircraft 20 turns left and flies along a second leg 2 that circles back within a specified proximity to the position at which the first image was captured. During this second pass, the aircraft 20 may have a left bank angle of 45° when the second image of target 22 is captured, as depicted in the inset labeled "~45° left bank" in FIG. 8. After the second image is captured, the aircraft 20 turns right and flies along a third leg 3 that again circles back within a specified proximity to the position at which the first image was captured. During this third pass, the aircraft 20 may have a right bank angle of 45° when the third image of target 22 is captured, as depicted in the inset labeled "~45° right bank" in FIG. 8. After the third image is captured, the aircraft 20 can continue to fly toward the target 22 along a straight leg 4. The polarization angles for the three passes through the same position, but at different bank angles, are indicated by respective two-headed arrows in FIG. 8. Within the limits of aircraft navigational precision, the plane puts the camera in exactly the same position for all three photos by circling and returning to the position of the first photo.

The aircraft carrying the camera and polarizing filter may have fixed or rotary wings. Although most rotorcraft can yaw while hovering, as in Embodiment 2, some cannot achieve a large bank angle while hovering. These rotorcraft may use the maneuvers shown in FIG. 7 or FIG. 8. However, some rotorcraft can achieve 45° bank angle by accelerating sideways from a standstill. These may capture images while rapidly moving left and right with no forward motion.

Fourth Embodiment

For any of the above-described embodiments: instead of one camera, the aircraft ca be equipped with two cameras aimed roughly parallel to each other, each camera having respective fixed polarizing filters which are oriented at roughly 90° relative to each other. With this arrangement, a 45° turn, bank, or yaw (depending on the cameras' orientation) acquires all linear Stokes parameters in two maneuvers rather than in the three needed in the prior embodiments.

The fourth embodiment imposes extra weight and cost for an additional camera and filter beyond the single camera needed for the first through third embodiments, but it provides some operational savings by using only two maneuvers in place of three. Compared to the prior art solution with multiple cameras, this embodiment uses one fewer camera, thereby saving some weight and cost.

Fifth Embodiment

Figure 9:
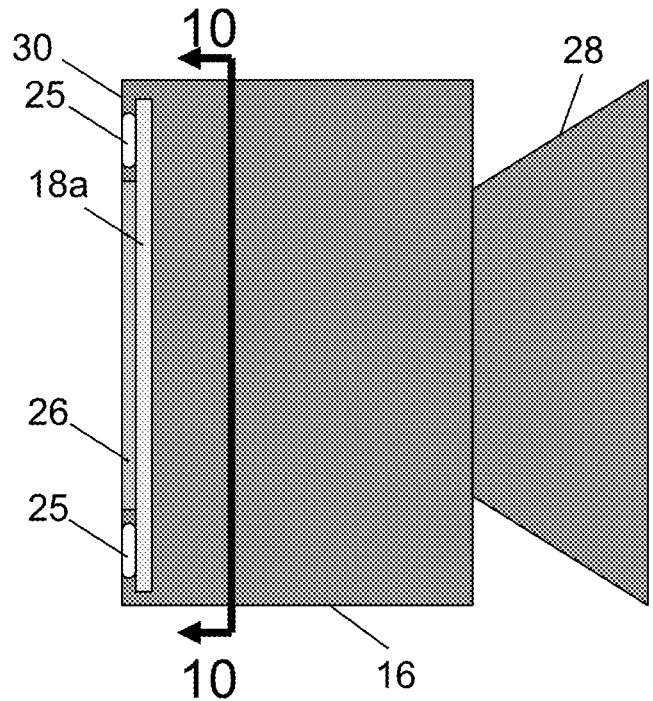
FIG. 9 is a diagram showing a camera configuration in which a polarizing filter overlies a portion of a focal plane array of pixels inside the camera.
Figure 10:
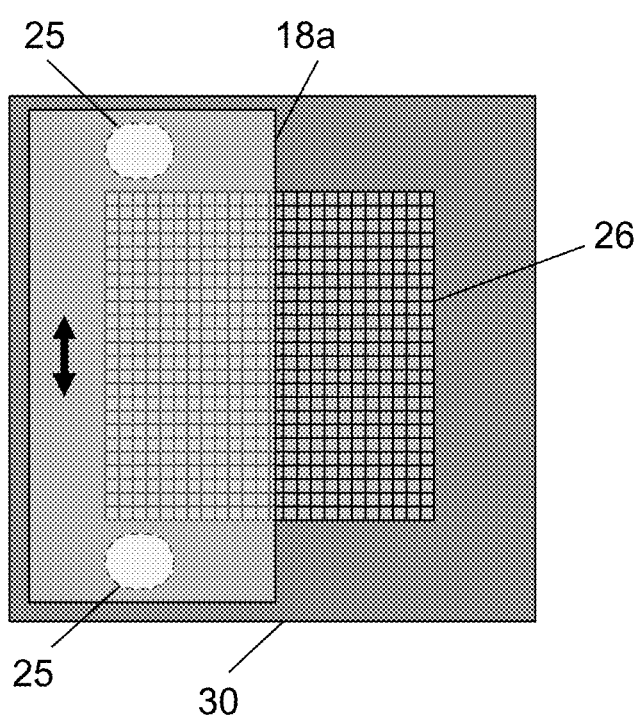
FIG. 10 is a diagram representing a front view of the polarizing filter overlying a portion of a focal plane array. This is the view that would be visible if the camera were sectioned along a plane indicated by line 10-10 in FIG. 9.

In the embodiment shown in FIGS. 9 and 10, part of the focal plane array 26 of pixels inside the camera 16 is covered with a polarizing filter 18a and part is uncovered so that the result is regular (unpolarized) images from that portion of the focal plane array 26. FIG. 9 shows a camera configuration in which a polarizing filter 18 overlies a portion of a focal plane array 26 of pixels inside a camera 16. The polarizing filter 18 can be bonded to the focal plane array 26 using adhesive 25. The focal plane array 26 in turn is affixed to the rear wall 30 of the housing of camera 16.

FIG. 10 is a front view of the polarizing filter 18 overlying a portion of a focal plane array 26. The orientation of the polarizing filter 18 is indicated by a two-headed arrow in FIG. 10. The uncovered part of the focal plane array 26 measures total intensity, which is one of the measurements used to compute Stokes parameters. It also provides a conventional image when polarimetry is not needed. The covered part of the focal plane array 26, together with aircraft maneuvers to point that part of the focal plane array 26 at a target and to orient the polarizing filter 18 properly, provides intensity measurements at one or two polarization orientations.

Putting a uniform filter over part of a focal plane array of a CCD is much cheaper and easier than the prior art solution of putting a particular filter orientation over each pixel. The former technique requires one piece of plastic or glass to be attached with a precision of about 1 mm. The task can be done by hand, and it can be used to modify a camera already installed in an aircraft. The latter (prior art) technique requires roughly one million individually oriented filters to be positioned to within a fraction of a pixel width, e.g., a micron or two. It requires precise electro-optical fabrication systems and can be plausibly done only in a factory.

In an alternative embodiment (not shown), the non-polarizing portion is covered with a neutral density optical filter that transmits about 50% of the incident light. Since a polarizing filter transmits about 50% of incident light when the scene is unpolarized or only slightly polarized (as in most outdoor scenes), the 50% gray filter roughly matches the transmittance of the polarizer. Matching the transmittance means both sides of the CCD image are about equally well exposed, which improves image usability and intensity resolution.

Sixth Embodiment

Figure 11:
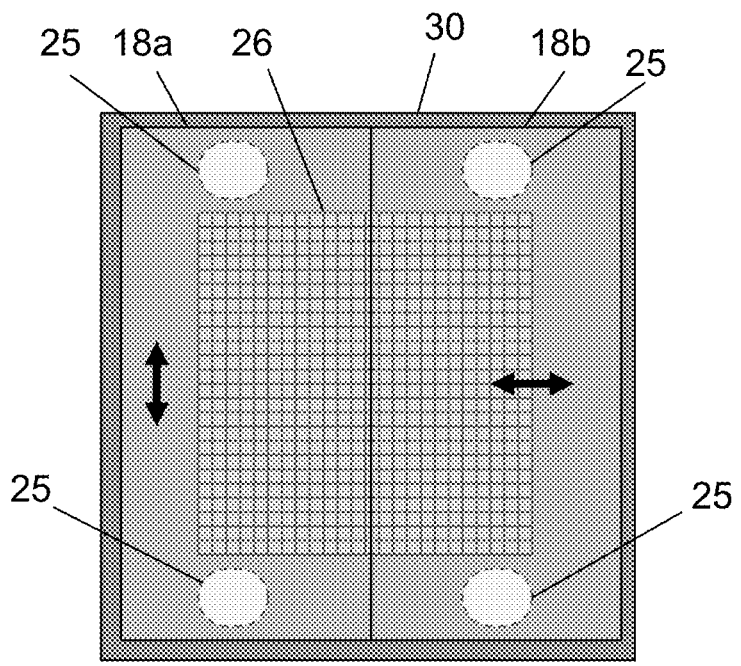
FIG. 11 is a diagram representing a front view of two linear polarizing filters overlying respective halves of a focal plane array in accordance with one embodiment. The two linear polarizing filters are oriented perpendicular to each other.

In the embodiment shown in FIG. 11, the camera 16 is modified to have two polarizing filters 18a and 18b with different orientations in front of and covering respective halves of the focal plane array 26. The aircraft maneuvers to image the target on each section of the focal plane array 26 rather than to rotate about its optical axis. This enables measurement of various polarizations with one or a few small re-orientations of the aircraft, rather than multiple large maneuvers. With a forward-facing camera, the configuration of FIG. 11 needs only a 45° roll in addition to a small change of heading or pitch in order to make measurements at three different polarization angles.

Figure 12:
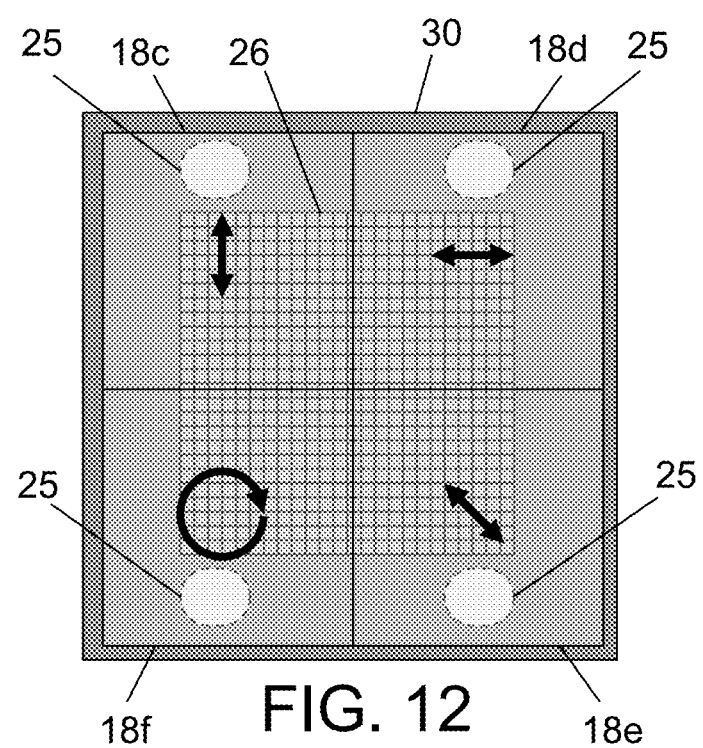
FIG. 12 is a diagram representing a front view of four polarizing filters overlying respective quadrants of a focal plane array. Three of the four polarizing filters are linear with different orientations, while the fourth polarizing filter is circular.

The configuration shown in FIG. 12 comprises three linear polarizing filters 18c-18e with respective orientations and a circular polarizing filter 18f in front of and covering respective quadrants of the focal plane array 26. This configuration typically needs just a degree or two of heading or pitch change to make measurements at three or four polarization angles (i.e., the aircraft need not roll). The circular polarizing filter 18f can measure the full Stokes vector in applications where circular polarization is significant. Alternatively, the quadrant of the focal plane array 26 covered by the circular polarizing filter 18f could instead be covered by a neutral density filter to provide an unpolarized intensity measurement.

Seventh Embodiment

Figure 13:
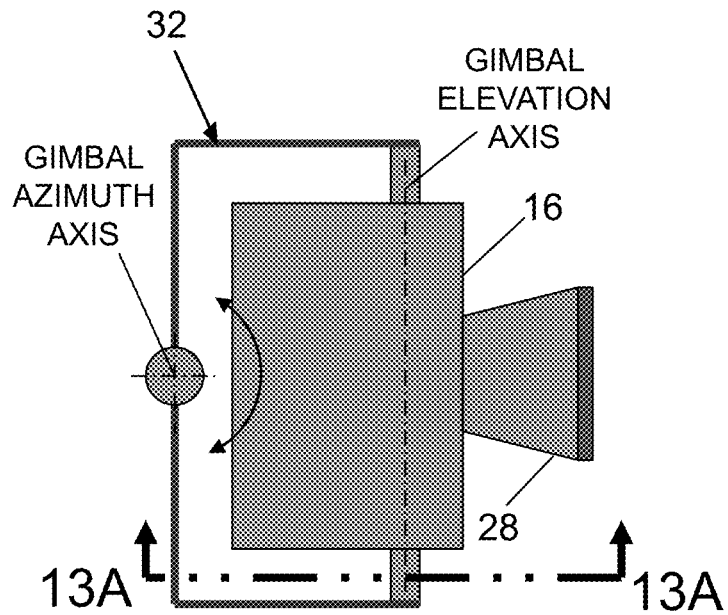
FIG. 13 is a diagram representing a top view of a typical two-axis gimbal-mounted camera.
Figure 13A:
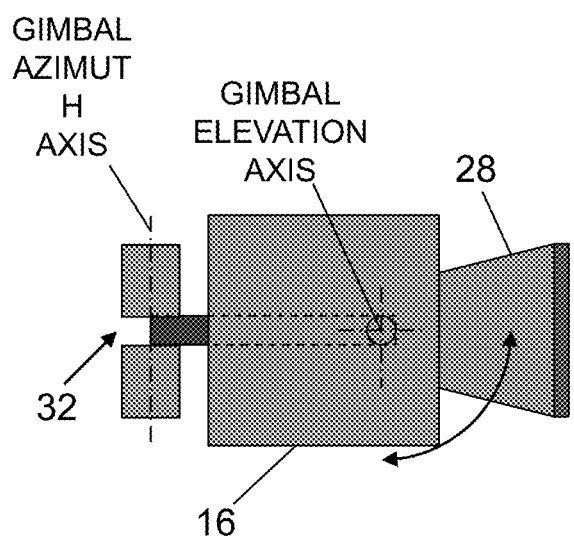
FIG. 13A is a diagram representing a sectional view of the gimbal-mounted camera depicted in FIG. 13. The gimbal is sectioned along a plane indicated by line 13A-13A in FIG. 13.

In another embodiment, the invention exploits the presence of a gimbal-mounted camera in some aircraft. FIG. 13 is a diagrammatic top view of a typical gimbal-mounted camera 16 having a lens unit 28. FIG. 13A is a sectional view of the gimbal-mounted camera depicted in FIG. 13, the gimbal being sectioned along a plane indicated by line 13A-13A in FIG. 13. The gimbal 32 has two mutually perpendicular axes of rotation. The camera 16 can swing leftward and rightward about the gimbal azimuth axis and can rotate about the gimbal elevation axis to point the lens unit 28 upward and downward. In this configuration, the azimuth and elevation axes are perpendicular to the optical axis of the camera 16 and to each other.

Figure 14:
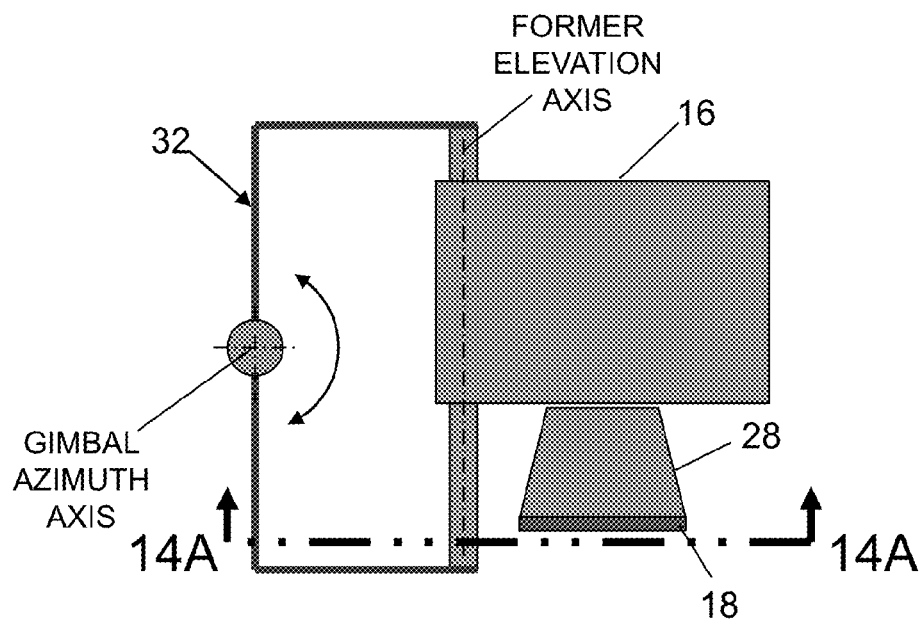
FIG. 14 is a diagram representing a top view of a gimbal-mounted camera designed to facilitate changing the orientation of a polarizing filter attached to the camera.
Figure 14A:
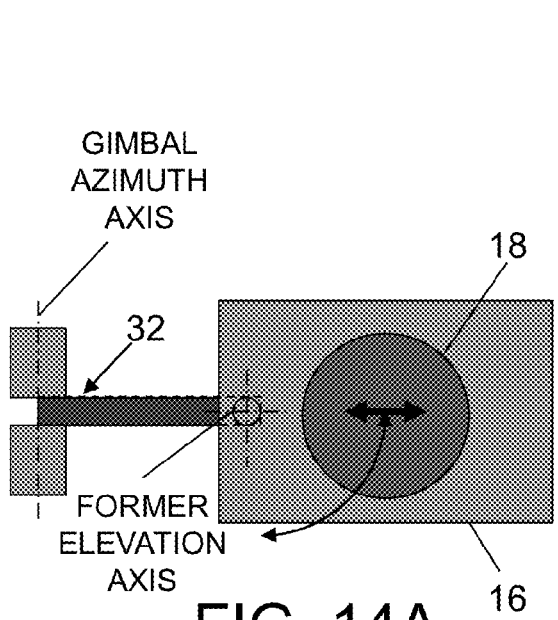
FIG. 14A is a diagram representing a sectional view of the gimbal-mounted camera depicted in FIG. 14. The gimbal is sectioned along a plane indicated by line 14A-14A in FIG. 14.
Figure 14B:
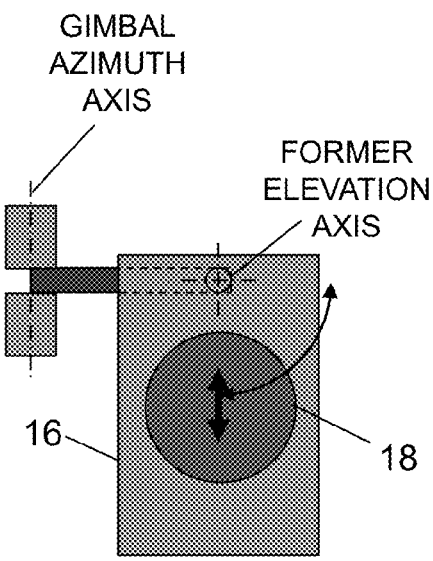
FIG. 14B is a diagram representing a sectional view of the gimbal-mounted camera after it has been rotated about the former gimbal elevation axis by 90°.

In accordance with a seventh embodiment shown in FIGS. 14, 14A and 14B, a gimbal-mounted camera 16 designed to facilitate changing the orientation of a polarizing filter 18 which is attached to the lens unit 28 of the camera 16. As seen in FIG. 14, the camera 16 is mounted crosswise in the gimbal 32 in a manner such that the former elevation axis is parallel to the optical axis of the camera 16. In this configuration, the camera 16 can rotate about the former elevation axis between first and second angular positions, causing the polarizing filter 18 to swing upward and downward, as seen in FIGS. 14A and 14B. For the purpose of illustration, it is assumed the amount of rotation depicted in FIGS. 14A and 14B is 90°. When the camera 16 is in the first angular position, the polarizing filter 18 is oriented horizontally (seen in FIG. 14A); when the camera 16 is in the second angular position, the polarizing filter 18 is oriented vertically (seen in FIG. 14B). In FIGS. 14A and 14B, the straight two-headed arrows indicate the respective orientations of the polarizing filter 16, while the curved two-headed arrows indicate the curved path of the center of the polarizing filter as the camera 16 rotates between the first and second angular positions. The ability to change the orientation of the polarizing filter 18 enables the camera 16 to provide images at various polarization angles. In this seventh embodiment, the former elevation axis no longer aims the camera 16 up and down. The azimuth axis continues to provide left-right pointing over about half the range it had in a prior art device. Aircraft maneuvers provide pointing in other axes.

Eighth Embodiment

Figure 15:
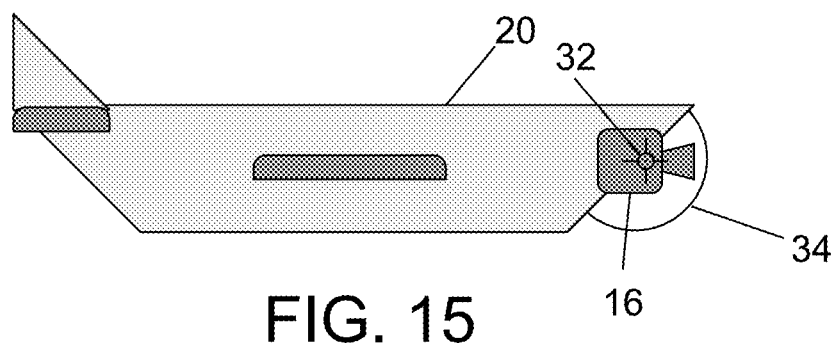
FIG. 15 is a diagram representing a side view of an unmanned aerial vehicle having a gimbaled camera in a ball turret.
Figure 16:
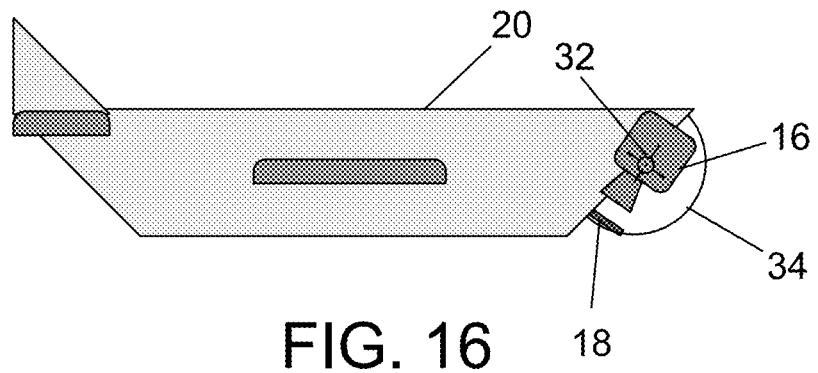
FIG. 16 is a diagram representing a side view of an unmanned aerial vehicle having a gimbaled camera in and a polarizing filter applied on a ball turret to polarize a portion of the camera's field of regard.

FIG. 15 shows a side view of an unmanned aerial vehicle 20 having a camera 16 mounted on a gimbal 32 (partly shown) in a ball turret 34. For gimbal-mounted cameras that look outward through a clear ball turret 34 (or window), a portion of the ball turret 34 (or window) can be covered by a polarizing filter 18 to polarize a portion of the camera's field of regard, as shown in FIG. 16. For conventional imaging, the gimbal 32 is used to aim the camera 16 out the unfiltered portion of the ball turret 34 (or window). For polarimetry, the gimbal 32 is used to aim the camera 16 at the target (not shown in FIG. 16) and the aircraft is oriented to place the polarizing filter 18 between the camera 16 and the target. If multiple filter orientations are needed, the aircraft 20 performs maneuvers as previously described for other embodiments to orient the polarizing filter 18.

It is understood that UAV operators rarely point the camera 16 through the lower aft portion of the turret ball 34. Using that position for a polarizing filter 18 would therefore have minimal impact on ordinary operations, yet enable the acquisition of polarimetry data. As in the third embodiment, rolling the aircraft left or right changes the filter orientation.

FIG. 16 shows the polarizing filter 18 mounted inside the ball turret 34. In cases where that is not feasible, the polarizing filter 18 may be mounted outside the ball turret 34, using an appropriate fairing to minimize aerodynamic drag.

Another option (not shown in the drawings) is to mount the polarizing filter 18 on one side of the ball turret 34, e.g., the starboard side. Then a UAV circling a target counter-clockwise in a left-hand bank could acquire ordinary unpolarized imagery, but by circling the target clockwise in a right-hand bank the UAV could acquire polarized imagery. Viewing the target at various positions on the focal plane, together with changes in the UAV's pitch angle, allows polarization measurements at various orientations.

The embodiments described to this point operate on the principle of maneuvering a vehicle so that the orientation of a polarizing filter is varied during imaging of a target using a camera. Other embodiments operate on a principle that exploits the optical properties of a camera without a dedicated polarizing filter to determine the amount of polarized light in a scene. In accordance with some embodiments, a system and a method are provided which determine the polarization of light from one or more objects in a scene without using a polarizing filter. A series of images is acquired with a camera oriented at various angles so the objects appear at various positions on the focal plane of the camera. Light impinging on the lens at a non-perpendicular angle is partially reflected, with the reflected light being polarized parallel to the lens surface and the transmitted light being polarized perpendicular to the lens surface. Comparing images from the series, one would expect to see each polarized object's intensity vary with the position of its projected image in the focal plane. This variation of intensity reveals the polarization of light from each object.

For a typical embodiment that uses a camera without a polarizing filter, the system comprises: an aircraft; an onboard navigation and control system having the capabilities previously described; an onboard camera having a known orientation with respect to the aircraft; an onboard control system capable of controlling the camera to capture images when the aircraft arrives at the selected position with one of the selected orientations; a computer (onboard or on the ground) programmed to register the images and compute polarization values of a target in accordance with stored data representing a characterization of the camera's polarizing power; and means for transferring camera images to the computer.

Embodiments which do not use a polarizing filter employ means and methods for characterizing a camera's polarizing power (specifically, two elements of its Mueller matrix) versus angle, so that the camera can be used as described in the preceding paragraph. This characterization of the camera's polarizing power involves a polarized light source with a known angle and degree of polarization (typically used in a laboratory or factory); a camera; a computer configured to receive images from the camera; and software on the computer for processing images generated with the polarized light source and the camera to determine the Mueller matrix elements that characterize the camera's polarizing power.

The major steps of a process for acquiring polarimetry data using a camera without an attached polarizing filter are as follows:

(1) By measurement or by calculation, the camera's polarizing power (i.e., Mueller matrix) versus angle is determined.

(2) After characterization of the camera's polarizing power, a series of camera images of a target are captured. The camera orientation is changed between successive images so the target is imaged at various points on the focal plane of the camera. For some applications, the camera is mounted to an aerial vehicle. The camera's orientation is controlled by maneuvering the aerial vehicle.

(3) The captured image data is then transferred from the camera to the computer.

(4) The computer then processes the image data, using the Mueller matrices of the camera to calculate the amount and the angle of polarization in light from the target.

Before disclosing various embodiments that rely on characterization of the polarizing power of a camera, further discussion of aspects of light polarization will be helpful. Physicists and engineers describe the polarization of electromagnetic waves as having two orthogonal components corresponding to the directions in which the electric field oscillates. In strongly polarized radiation, one of these components is much stronger than the other. Natural sunlight is unpolarized, i.e., the two polarization components have equal magnitude.

Figure 17A:
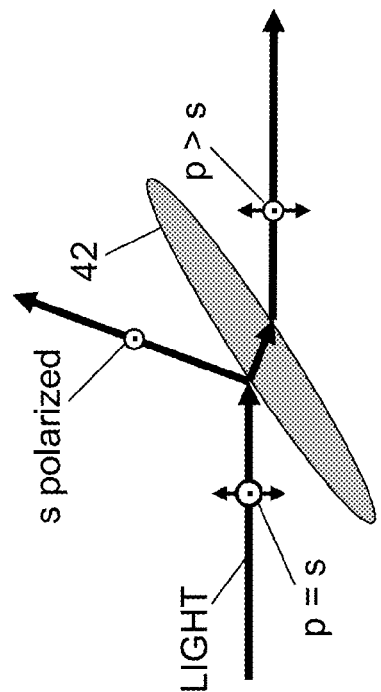
FIGS. 17A and 17B are diagrams which respectively show no polarization when light strikes glass at perpendicular incidence (FIG. 17A) and stronger reflection of s-polarized light at oblique incidence which increases p-polarized light in the transmitted beam (FIG. 17B).
Figure 17B:
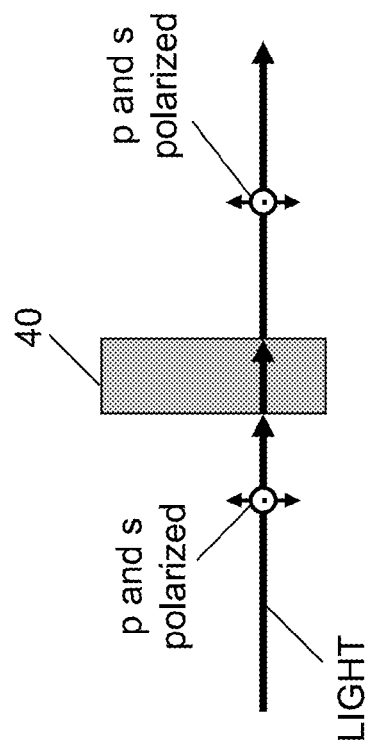

It is well known that partial reflection at a transparent surface can split a beam of light into two beams, each of which is partially or completely polarized. This can be demonstrated by passing light through a flat sheet of glass at an oblique angle. FIG. 17A shows no polarization when light strikes a flat sheet 40 made of glass at perpendicular incidence. FIG. 17B shows stronger reflection of s-polarized light at oblique incidence, which increases the proportion of p-polarized light in the transmitted beam. Only the first surface reflection is shown. In reality, there is also reflection from the back surface. FIGS. 17A and 17B (and other figures) follow the common convention of naming the two polarization components s and p, each named as a mnemonic for what they are parallel to: s is parallel to the surface and p is parallel to the plane of incidence. In the figures, p-polarized light is shown by arrows indicating a vector in the plane of the page and s-polarized light is shown by circles indicating a vector perpendicular to the page. Intensity of each polarization component is indicated by the length of each arrow or the diameter of each circle. The light reflected from each surface is mostly s-polarized when not impinging at an incidence angle near 0° (the situation depicted in FIG. 17B). The light remaining in the transmitted beam is somewhat depleted in the s-component and therefore is slightly more p-polarized when the incident beam is not impinging at an incidence angle near 0°. The ratio of the two components depends on the angle of incidence and the index of refraction of the glass. The coefficient amplitudes for reflection and transmission of waves parallel and perpendicular to the surface can be calculated using the Fresnel equations. For any incident angle $\theta_i$, the Fresnel equations appear as follows:

$$r_s = \frac{n_i \cos\theta_i - n_t \cos\theta_t}{n_i \cos\theta_i + n_t \cos\theta_t} \tag{5}$$

$$r_p = \frac{n_t \cos\theta_i - n_i \cos\theta_t}{n_t \cos\theta_i + n_i \cos\theta_t} \tag{6}$$

$$t_s = \frac{2 n_i \cos\theta_i}{n_i \cos\theta_i + n_t \cos\theta_t} \tag{7}$$

$$t_p = \frac{2 n_i \cos\theta_i}{n_t \cos\theta_i + n_i \cos\theta_t} \tag{8}$$

where $n_i$ is the index of refraction for the incident medium, $n_t$ is the index of refraction for the transmitted medium, $\theta_i$ is incident angle, and $\theta_t$ is the transmitted angle, which can be calculated using $n_i$, $n_t$, $\theta_i$, and Snell's law.

Mueller Matrices

As previously discussed with reference to Eqs. (1)-(4), the Stokes parameters can be calculated based on angles relative to an optical element. A polarizing filter, camera lens, or other optical element may transform polarized light from a form describable by a first Stokes vector to another form describable by a second Stokes vector. The most common way to mathematically describe that transformation is the Mueller calculus, where the transformation is specified by a 4×4 matrix. The formalism looks like Eq. (9):

$$S_2 = MS_1 \tag{9}$$

where $S_1$ is the first Stokes vector, M is the Mueller matrix of an optical element, and $S_2$ is the second Stokes vector. The Mueller matrix of a perfect horizontal polarizing filter is as follows:

$$\frac{1}{2}\begin{pmatrix} 1 & 1 & 0 & 0 \\ 1 & 1 & 0 & 0 \\ 0 & 0 & 0 & 0 \\ 0 & 0 & 0 & 0 \end{pmatrix}$$

For a perfect vertical polarizing filter, the matrix is:

$$\frac{1}{2}\begin{pmatrix} 1 & -1 & 0 & 0 \\ -1 & 1 & 0 & 0 \\ 0 & 0 & 0 & 0 \\ 0 & 0 & 0 & 0 \end{pmatrix}$$

Eq. (10) is an example showing how the Mueller calculus works. An unpolarized incoming beam of light (represented on the far right of Eq. (10) by a vector $S_1$) with intensity 1 is polarized at 45° upward to the right. It passes through a vertical polarizing filter (represented by a Mueller matrix), becoming a vertically polarized beam (represented on the left side of Eq. (10) by a vector $S_2$) with intensity ½:

$$\frac{1}{2}\begin{bmatrix} 1 \\ -1 \\ 0 \\ 0 \end{bmatrix} = \frac{1}{2}\begin{pmatrix} 1 & -1 & 0 & 0 \\ -1 & 1 & 0 & 0 \\ 0 & 0 & 0 & 0 \\ 0 & 0 & 0 & 0 \end{pmatrix}\begin{bmatrix} 1 \\ 0 \\ 1 \\ 0 \end{bmatrix} \quad (10)$$

In the examples above, a Mueller matrix describes an entire optical element, e.g., a polarizing filter or a camera lens. In the case of a camera lens, the Mueller matrix depends on the angle of incidence $\theta_i$ at which a particular beam of light impinges on the lens and the angle of orientation $\phi$ about the optical axis. Therefore, this disclosure sometimes refers to specific Mueller matrices as M(θ) when only incidence angle matters and other times refers to specific Mueller matrices as M(θ,φ), or some similarly specific term, when both parameters matter.

Simple Qualitative Example

Figure 18A:
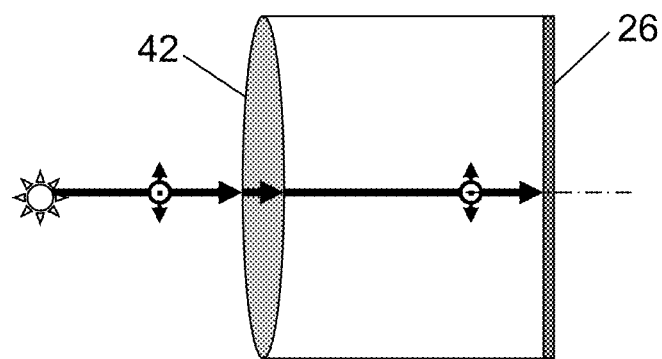
FIGS. 18A through 18C are diagrams which respectively show different polarization by a lens at different angles $\theta=0$ (FIG. 18A), ~20° (FIG. 18B), and ~40° (FIG. 18C) from the optical axis, corresponding to respective different pixel positions.
Figure 18B:
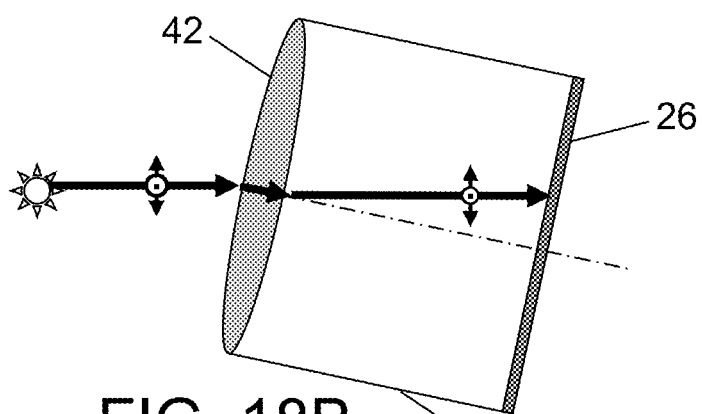
Figure 18C:
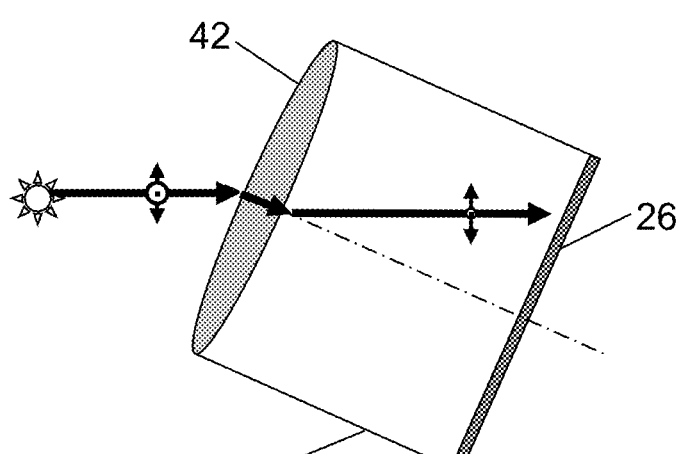

In a CCD camera, the lens focuses incoming light to various points on a focal plane array. FIGS. 18A through 18C are diagrams which respectively show different amounts of polarization by a lens 42 at different angles θ=0, ~20°, and ~40° from the optical axis of a camera 16, corresponding to respective different pixel positions. The angle at which the light reaches the lens 42 determines the position at which the light focuses on the focal plane array 26.

Figure 19:
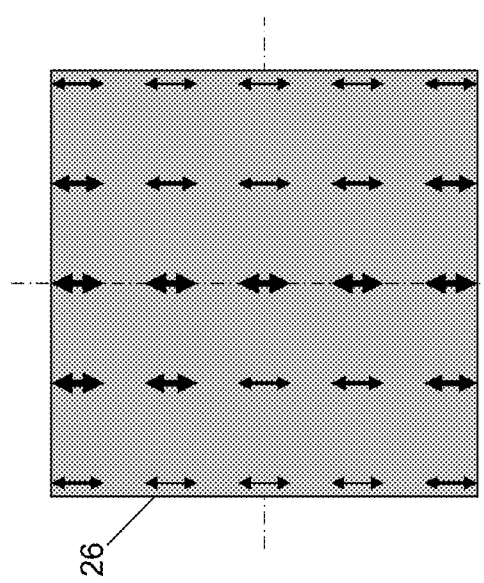
FIG. 19 is a diagram showing different polarization of light passing through a lens at different angles, corresponding to different positions of an object image on a focal plane array. Ellipse eccentricity shows the degree of polarization; ellipse orientation shows the polarization direction.

FIG. 19 shows different polarization of light passing through a lens 42 at different angles, corresponding to different positions of an object image on a focal plane array 26. Ellipse eccentricity shows the degree of polarization; ellipse orientation shows the polarization direction. Since light arriving at zero angle of incidence gets focused to the center of the focal plane array 26 (see FIG. 18A), light focused at the center of the focal plane array 26 incurs no polarization from the lens 42 (see FIG. 19). Light arriving at a large angle gets focused near the edge of the focal plane array 26 (see FIG. 19), so light illuminating the edge of the focal plane array 26 incurs maximum polarization from the lens 42. As a result, the lens 42 acts as a polarizing filter: if the light coming to the camera 16 from the outside scene is already polarized perpendicular to the lens' polarizing effect, then the lens 42 reduces the intensity of the light. This means the apparent intensity of a given object in the scene depends on (a) its actual intensity, (b) its polarization, and (c) its position on the focal plane.

Figure 19A:
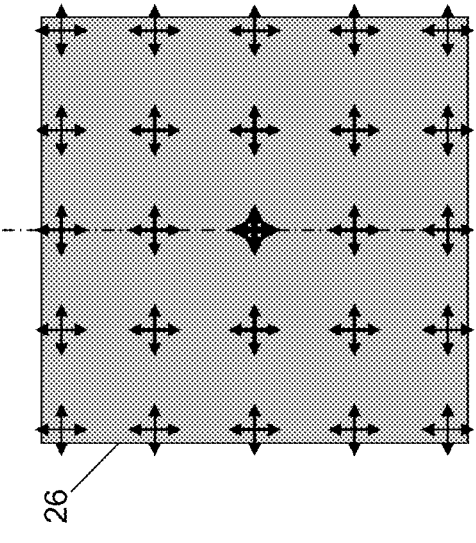
FIGS. 19A through 19C are diagrams which respectively show different intensities of a scene object at different pixel positions which reveal its polarization (line width indicates intensity) for vertically polarized light (FIG. 19A), horizontally polarized light (FIG. 19B), and unpolarized light (FIG. 19C).
Figure 19B:
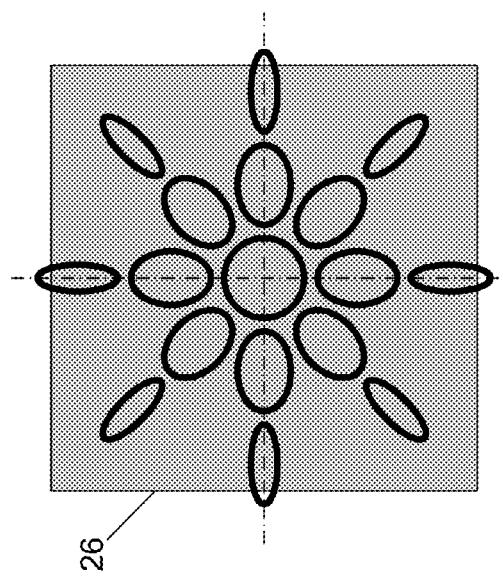
Figure 19C:
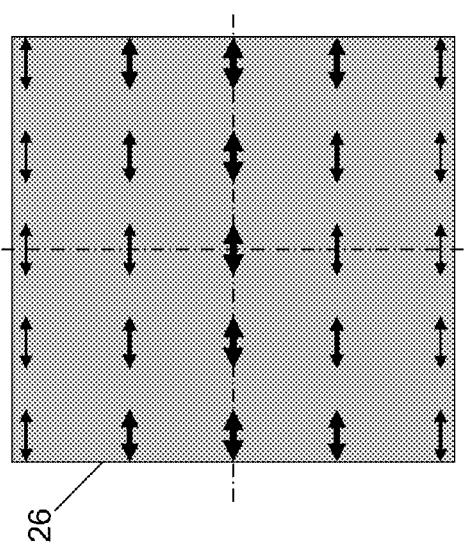

FIGS. 19A through 19C show different intensities of a scene object at different pixel positions which reveal its polarization (line width indicates intensity) for vertically polarized light (FIG. 19A), horizontally polarized light (FIG. 19B), and unpolarized light (FIG. 19C). As seen in FIG. 19A, a vertically polarized object remains bright when it appears near a vertical line through the center of the focal plane, but it becomes dim in an arc to the right or left of the center. A horizontally polarized object remains bright when it appears within an arc near a horizontal line through the center of the focal plane, but it becomes dim in an arc above or below the center (see FIG. 19B). As seen in FIG. 19C, the intensity of an unpolarized object fades with distance from the center of the focal plane, regardless of the object's direction from the center.

The foregoing discussion was premised on light with varying polarization and varying arrival angle interacting with a fixed camera and its focal plane. Alternatively, one can think of the impinging light having fixed polarization in fixed coordinates, e.g., traveling in the x-direction, while the camera orientation changes. FIGS. 20A-20C illustrate this approach.

FIG. 20A shows a sectional view of an untilted lens 42a (zero incidence angle) and a lens 42b tilted at a non-zero angle θ. These lenses are sectioned along a plane indicated by line 20A-20A in FIG. 20B. FIG. 20B shows front views of the lenses 42a, 42b depicted in FIG. 20A and other lenses 42c, 42d which are tilted by the same angle θ relative to arriving light, but they tilt at different orientation angles φ about the optical axis. FIG. 20C represents object images projected onto a focal plane array 26 by the lenses depicted in FIG. 20B, assuming the focal plane array 26 is parallel to each lens and centered on the lens's optical axis as in a typical camera. The angle φ corresponds to angular position about the center of the focal plane. Light passing through lenses at these orientations focuses at different points on the focal plane array 26. Therefore, a pixel's φ-coordinate on the focal plane corresponds to the orientation of the light relative to the lens surface when the light passed through the lens. This affects the relative amount of s-polarization and p-polarization in incoming polarized light. Incoming horizontally polarized light that focuses to a location with φ=0 is p-polarized with respect to a lens. Incoming horizontally polarized light that focuses to a location with φ=90° is s-polarized. In accordance with some embodiments, the aerial vehicle can be maneuvered in such a way that the camera will be oriented at different angles so light from a single target is focused to points with various φ values.

Complications

The optical path from a target to a CCD camera's sensor poses further complications that must be taken into account if the camera is to be characterized by a correct Mueller matrix.

Curved Lens.

Figure 21A:
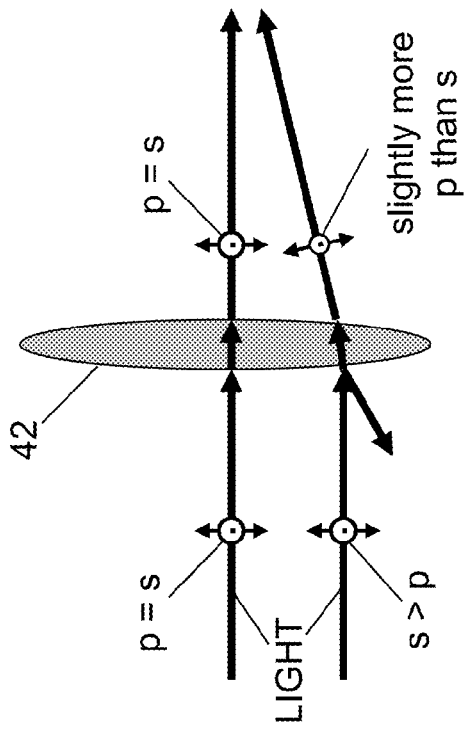
FIG. 21A is a diagram which shows that light parallel to a lens axis is not polarized at the center of lens and only weakly polarized at the edge of lens.
Figure 21B:
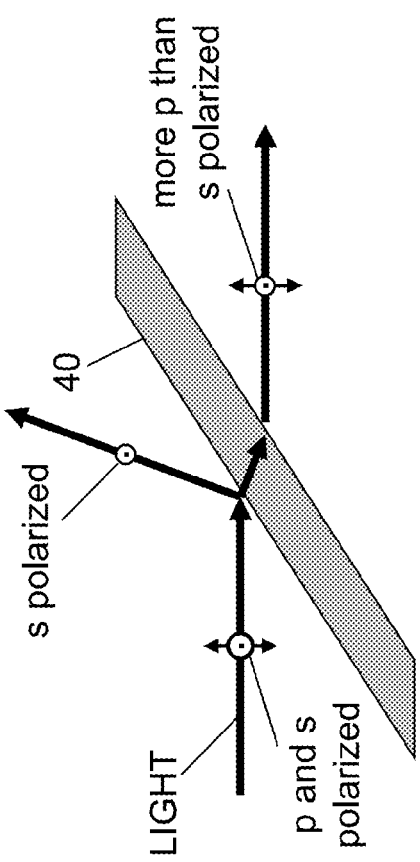
FIG. 21B is a diagram which shows that light arriving at a large angle incurs stronger polarization at all points on the lens. (The degree of polarization varies slightly across the lens surface; only the center beam is shown.)

With a flat sheet of glass, incoming collimated light strikes every point on the surface at the same angle, and therefore every point on the surface polarizes the transmitted beam to the same degree as every other point (see FIG. 17B). A camera lens has a curved surface, so a collimated beam of light does not strike the lens at the same angle over the entire surface. There is thus a slightly varying degree of polarization for light transmitted through various points on the lens 42 (see FIG. 21A). However, for a lens with circular symmetry (i.e., nearly all of them) and a target near the center of the image, polarization incurred at any point A on the lens is nearly canceled by opposite and almost equal polarization of light at a point B equidistant from the center of the lens and 90° around the axis from point A. Therefore, the net effect is similar to that of a flat sheet of glass: light arriving parallel to the lens axis (i.e., roughly perpendicular to the lens surface) and focused to a point near the center of a focal plane array collectively incurs no polarization passing through the lens; but light arriving at a substantial angle relative to the lens axis and focused to a point far from the center of the focal plane array collectively incurs stronger polarization (see FIG. 21B). The degree of polarization varies slightly across the lens surface; only the center beam is shown in FIG. 21B.

A narrow camera aperture minimizes the effect of a curved lens surface: the lens curves very little over the area of a small aperture. A wide aperture increases the non-canceling differences among widely separated parallel paths through the lens. Therefore, some embodiments include aperture width as a parameter as well as θ in determining Mueller matrices for the camera.

Multiple Lenses.

Figure 22:
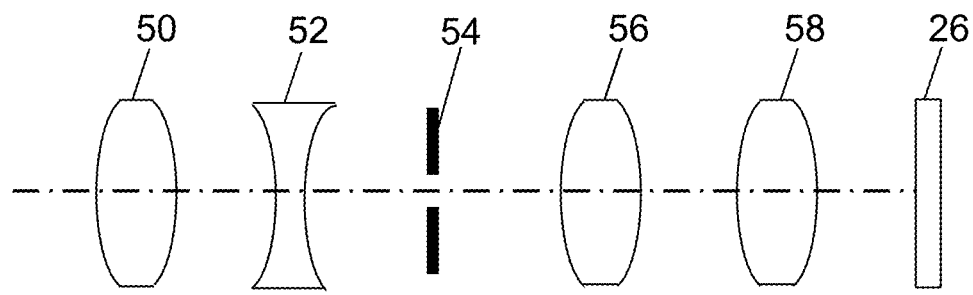
FIG. 22 is a diagram showing the basic arrangement of a typical inner focus-type lens system.

So far, this disclosure has treated a lens as a single piece of glass with reflections at the front and back surfaces. Typically any camera, including aerial surveillance cameras and the now commonly used point-and-shoot and single-lens reflex cameras, will have multiple lenses combined into a single camera lens unit. Each lens is made up of lens elements. Some are cemented together; others are not, instead having air-to-lens interfaces. Multiple lens elements are used to control aberrations and provide a sharp image. Partial reflections can occur at each interface, increasing the degree of polarization for off-axis light paths. For example, FIG. 22 shows a basic arrangement of an inner focus-type lens system comprising a fixed first lens group 50, a second lens group 52 for performing a zooming operation, an iris stop 54, a fixed third lens group 56, a fourth lens group 58 (referred to as a focus lens) having both a focusing function and a so-called compensator function of compensating for the movement of a focal plane caused by zooming; and an image sensing device such as a focal plane array 26. To reduce image artifacts such as flare and to increase the amount of transmitted light, lens makers typically coat elements with anti-reflective coatings, possibly made up of multiple layers and typically being more effective at some wavelengths than at others. These reduce, but do not eliminate, the polarization added at each air-to-lens interface.

Focal Plane Optics.

Figure 23:
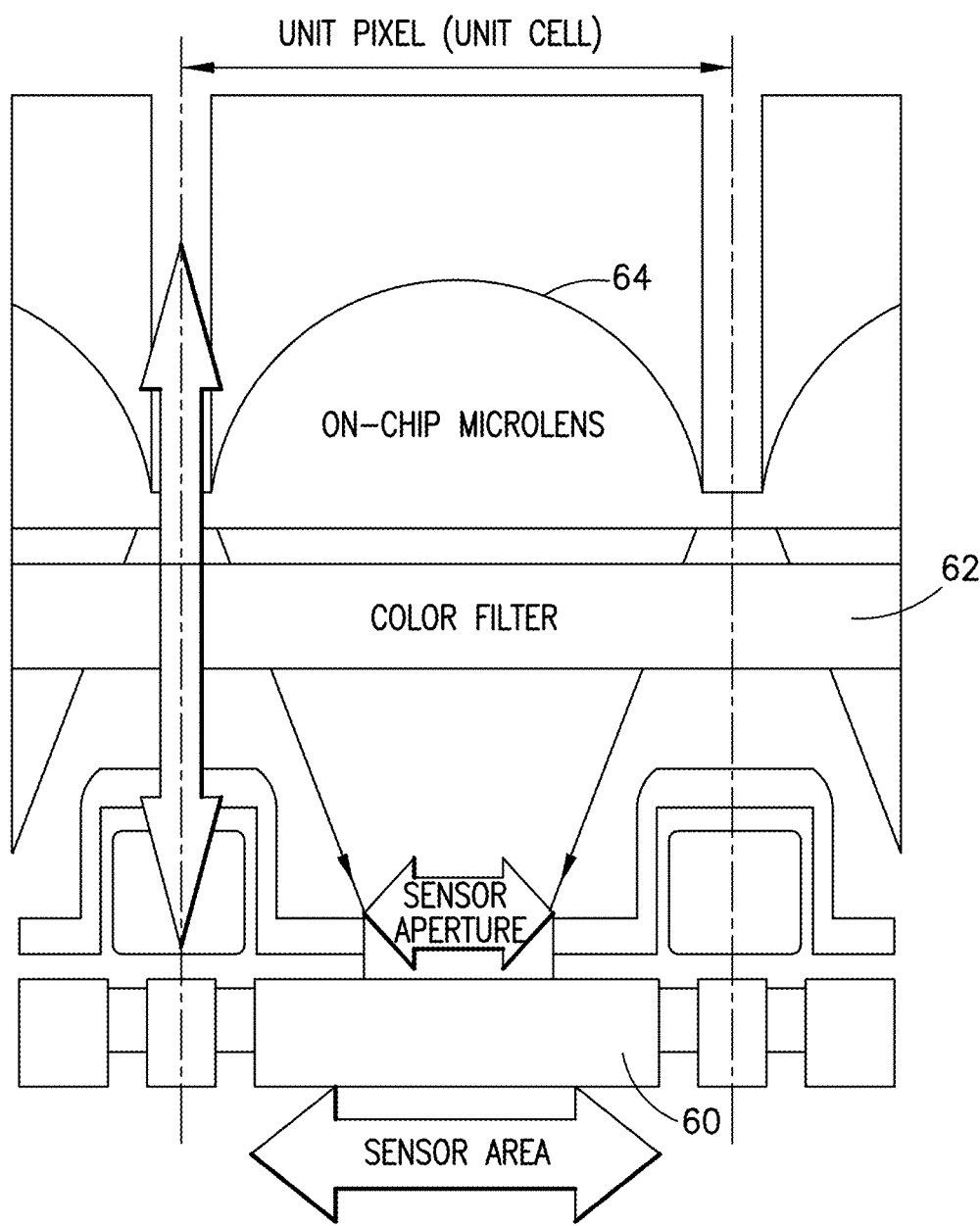
FIG. 23 is a diagram showing a sectional view of a focal plane array in a typical CCD.

Once through the camera lens, the light falls on the focal plane array, which is typically a CCD detector. Like the lens, the CCD may also increase polarization. The CCD is a multilayer device that not only collects the light by converting photons to an electric signal but also typically filters the light through an infrared filter and a color filter array (often a Bayer filter). FIG. 23 shows a sectional view of a unit cell of a typical CCD. The unit cell comprises a sensor 60, a color filter array 62 and an on-chip microlens 64. (A monochromatic device does not have color filters as part of the CCD.)

As seen in FIG. 23, light may encounter the on-chip microlens 64 used for maximizing the collection of light and directing it toward the sensor 60. The light then goes through a color filter array 62. Typically the color filter array will be a Bayer filter made up of red, green, and blue color filters patterned across the chip. At each interface through the microlens 64 and color filters 62, some reflection occurs. The further off-axis, the more this reflection increases polarization.

Sensor Surface.

Another partial reflection occurs at the filter-to-sensor surface, slightly increasing the polarization still further.

Methods for Characterizing a Camera

Computational Method.

One method to characterize a camera, i.e., to determine its Mueller matrices for several incidence angles, is to import a detailed geometric and material model of each lens element, coatings, adhesives, and focal plane optics into optical analysis software. The software calculates the polarization of light arriving at each point on the focal plane array. This method is not novel.

Experimental Method.

A second method is to make a series of intensity measurements and calculations using an experimental method. This method is easier than the computational method because all the complications described above are automatically accounted for. This experimental method comprises the following steps.

Figure 24:
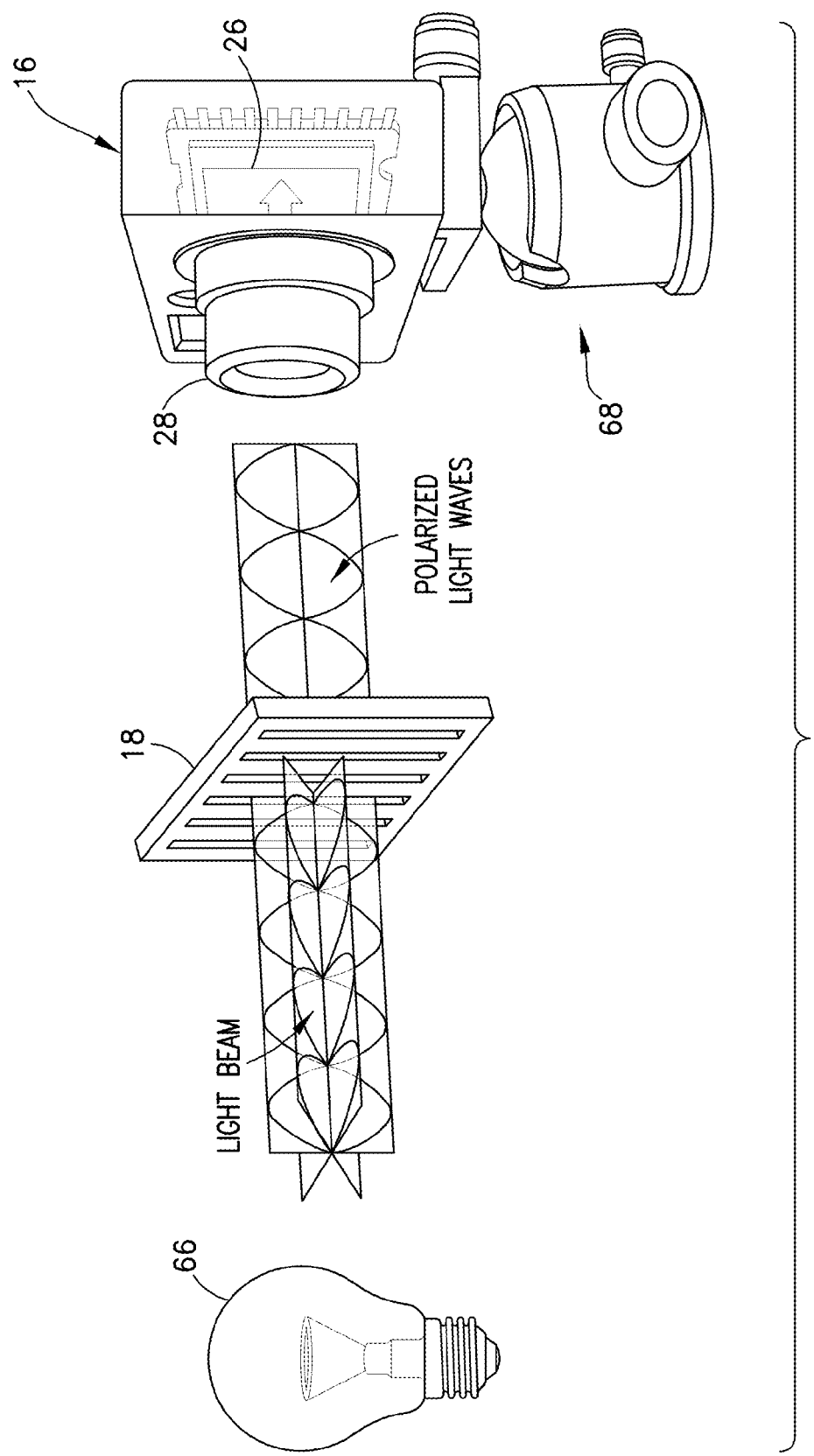
FIG. 24 is a diagram showings an experimental setup for characterizing a camera having a CCD.

First, set up the camera, including the selected lens, in a controlled optical environment. The setup typically includes an optical target, a polarizer which can be rotated to a selected orientation, and means to rotate the camera about at least one axis to take photos in which the target appears at various known angles off-axis. One example of such an experimental setup is shown in FIG. 24. A CCD camera 16 having a focal plane array 26 of sensors and a lens unit 28 is mounted on a pan-tilt mechanism 68. The lens unit 26 of camera 16 is aimed at a light source 66 with a polarizing filter 18 disposed therebetween. The light source 66 emits unpolarized light which is filtered by the polarizing filter to produce polarized light waves that impinge on the lens unit 28. (Although FIG. 24 shows the light source 66 emitting light directly toward the camera 16, in the actual experiment reported below, the camera received light after it had been emitted toward a sheet of white paper by a light source and then reflected toward the camera by the white paper.)

After setup, images of the target are captured at various camera positions and filter orientations. The Mueller matrix M(θ) is different at each off-axis angle θ. Therefore, image measurements must be made either (a) at every angle $\theta_i$ for which an accurate Mueller matrix is desired, or (b) at angles spaced close enough to allow sufficiently accurate interpolation. At least two images must be captured at each angle $\theta_i$; as described below, typically three images are used to improve accuracy.

The range of angles $\theta_i$ at which to capture images varies with the camera and the application. A single reference image must be captured at angle θ=0. Since a camera has the strongest polarizing effect at the largest incident angle, a typical application captures images at angles from the reference image at θ=0 to the largest possible incident angle, i.e., a position with the target furthest from the center of the image. In most cases, this puts the target in a corner of a rectangular image. For computational simplicity, some embodiments use images with the target at the middle of an edge in a rectangular image, even though this is not as far from the center of the image as a corner.

The next few sections describe conditions for capturing the reference image at θ=0 and one set of images at some value of $\theta_i \neq 0$.

Reference Image: On-Axis, i.e., θ=0

The reference image uses an incident angle of 0°, i.e., the target is centered in the image. At this angle the lens and focal plane optics are treated as an ideal clear filter. (It is not, but this is not discernible unless a better camera or other instrument is used.) The corresponding Mueller matrix is the identity matrix as shown in Eq. (11):

$$\begin{bmatrix} I_0 \\ 0 \\ 0 \\ 0 \end{bmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \begin{bmatrix} 1 \\ 0 \\ 0 \\ 0 \end{bmatrix} \quad (11)$$

The target emits and/or scatters unpolarized light, which is described by the input Stokes vector at the far right in Eq. (11).

Each captured image is an array of pixel values $P_j$. Each pixel value is proportional to the intensity of light impinging on a corresponding point in the target scene. Pixel value $P_0$ measured at the target point in the reference image defines the reference intensity $I_0$, as shown in Eq. (12)

$$I_0 = \frac{P_0}{P_0} = 1 \quad (12)$$

Non-unity coefficients for Mueller matrices corresponding to other angles $\theta_i$ indicate changes relative to this reference intensity.

Images at $\theta=\theta_i$, $\phi=0$

The images taken at each incident angle $\theta=\theta_i$ all use the same rotation angle $\phi$. The rotation angle $\phi$ is defined by the plane containing the target, the center of the lens, and the point on the lens that is farthest from the target (see FIG. 20C). The rotation angle $\phi$ defines the coordinate system for polarization, that is, all characterization images are defined as being at $\phi=0$. Light polarized at $\phi=0$ is defined to be horizontally polarized, i.e., Q=1 in the chosen coordinate system. This definition makes horizontally polarized light the same as p-polarized light for the lens, and vertically polarized the same as s-polarized.

Target Unpolarized

One of the images at $\theta=\theta_i$ views the target with unpolarized light, i.e., no polarizing filter is used aside from the camera itself. This corresponds to the input Stokes vector shown at the far right in Eq. (13):

$$\begin{bmatrix} I_{\theta unp} \\ 0 \\ 0 \\ 0 \end{bmatrix} = \begin{pmatrix} A_{11} & A_{12} & 0 & 0 \\ 0 & 0 & 0 & 0 \\ 0 & 0 & 0 & 0 \\ 0 & 0 & 0 & 0 \end{pmatrix} \begin{bmatrix} 1 \\ 0 \\ 0 \\ 0 \end{bmatrix} \quad (13)$$

The image includes the measured pixel value $P_{\theta unp}$ at the target. The light reaching the camera from the target has the same intensity as in the reference image, but the measured pixel value is different, so the Mueller matrix element $A_{11}$ for $\theta=\theta_i$ is calculated using Eq. (14) and measured values $P_0$ and $P_{\theta unp}$:

$$\frac{I_{\theta unp}}{I_0} = \frac{P_{\theta unp}}{P_0} = A_{11} \quad (14)$$

Target Horizontally Polarized (p-Polarized)

One of the images at $\theta=\theta_i$ may view the target with light that has passed through a horizontal polarizer. (Since the camera is oriented with $\phi=0$, horizontal polarization is the same as p-polarization.) This corresponds to the input Stokes vector at far right in Eq. (15), including the filter's effect on overall intensity. (For an ideal polarizing filter, the intensity coefficient is ½, as shown. One of the methods disclosed below measures the real coefficient.)

$$\begin{bmatrix} I_{\theta p} \\ 0 \\ 0 \\ 0 \end{bmatrix} = \begin{pmatrix} A_{11} & A_{12} & 0 & 0 \\ 0 & 0 & 0 & 0 \\ 0 & 0 & 0 & 0 \\ 0 & 0 & 0 & 0 \end{pmatrix} \frac{1}{2}\begin{bmatrix} 1 \\ 1 \\ 0 \\ 0 \end{bmatrix} \quad (15)$$

The image includes the measured pixel value $P_{\theta p}$ at the target. From Eq. (15), we see that the Mueller matrix element $A_{12}$ for $\theta=\theta_i$ is related to the pixel value by Eq. (16):

$$\frac{I_{\theta p}}{I_0} = \frac{P_{\theta p}}{P_0} = \frac{A_{11} + A_{12}}{2} \quad (16)$$

This equation can be rearranged to get $A_{12}$ as shown in Eq. (17).

$$A_{12} = 2I_{\theta p} - A_{11} \quad (17)$$

Target Vertically Polarized (s-Polarized)

One of the images at $\theta=\theta_i$ view the target with light that has passed through a vertical polarizer. (Since the camera is oriented with $\phi=0$, vertical polarization is the same as s-polarization.) This corresponds to the input Stokes vector at the far right in Eq. (18).

$$\begin{bmatrix} I_{\theta s} \\ 0 \\ 0 \\ 0 \end{bmatrix} = \begin{pmatrix} A_{11} & A_{12} & 0 & 0 \\ 0 & 0 & 0 & 0 \\ 0 & 0 & 0 & 0 \\ 0 & 0 & 0 & 0 \end{pmatrix} \frac{1}{2}\begin{bmatrix} 1 \\ -1 \\ 0 \\ 0 \end{bmatrix} \quad (18)$$

The image includes the measured pixel value $P_{\theta s}$ at the target. From Eq. (18), we see that the Mueller matrix element $A_{12}$ for $\theta=\theta_i$ is related to the pixel value by Eq. (19):

$$I_{\theta s} = \frac{P_{\theta s}}{P_0} = \frac{A_{11} - A_{12}}{2} \quad (19)$$

This equation can be rearranged to get $A_{12}$ as shown in Eq. (20):

$$A_{12} = A_{11} - 2I_{\theta s} \quad (20)$$

Use s- and p-Polarized Images to Derive Average $A_{12}$ Estimate

Some embodiments use both the horizontally polarized and the vertically polarized images described above. These embodiments combine data to reduce the effect of noise and thereby improve the estimate of $A_{12}$. In these embodiments, Eq. (17) is added to Eq. (20) and the sum is divided by 2 to compute a mean estimate of $A_{12}$:

$$A_{12} = I_{\theta p} - I_{\theta s} \quad (21)$$

Using both horizontally and vertically polarized images yields another advantage: an estimate for the intensity coefficient of the polarizing filter used in these measurements. The intensity coefficient describes what fraction of unpolarized light gets through a filter. As noted earlier, an ideal polarizing filter has an intensity coefficient of ½. For a real polarizing filter, the intensity coefficient can be computed as the average fraction of light that gets through the filter at any two perpendicular polarizations, e.g., s-polarized and p-polarized. The pixel intensity for unfiltered light was already measured as $I_{\theta unp}$, as seen in Eq. (14). Therefore the intensity coefficient of the filter can be computed as:

$$\text{Intensity Coefficient} = \frac{I_{\theta p} + I_{\theta s}}{2 I_{\theta unp}} \quad (22)$$

This value replaces the coefficient ½ in Eqs. (15) and (18), leading to improved numerical coefficients in Eqs. (17), (20), and (21) for estimating $A_{12}$.

Mueller Matrix Measurement Example

Figure 25:
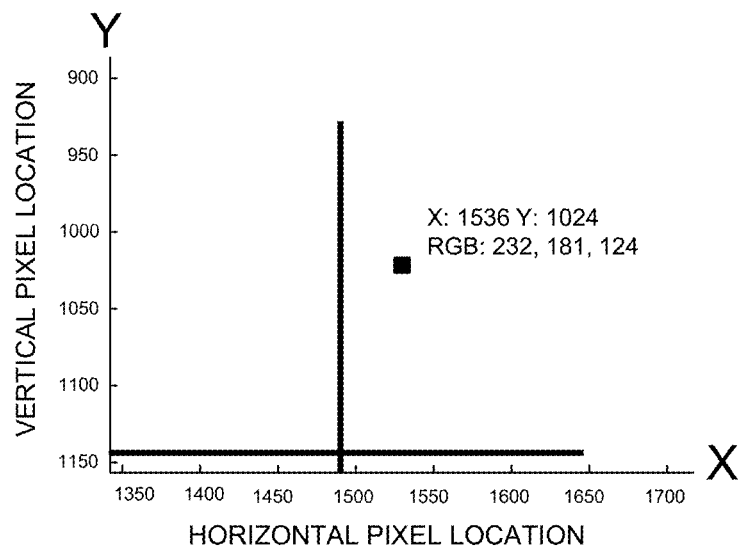
FIG. 25 is a diagram showing a close-up view of a portion of a target in a reference image acquired at θ=0°.

The above-described method was used to characterize a Canon EOS Rebel 300D camera with an 18-55 mm Canon EFS zoom lens set to 18 mm focal length and a clear filter in front of the lens. The light source was a sheet of white printer paper illuminated by a fluorescent desk lamp. The white printer paper had a cross-shaped target symbol drawn thereon (a portion of that target symbol is depicted in FIG. 25). Images were saved in 8-bit JPEG format. This level of quality suffices to show feasibility. In a more rigorous characterization, one would set the camera to produce images in 12-bit RAW format, which gives higher resolution and does not introduce compression errors.

The characterization method which will now be described uses sets of four pixels for each calculation, but that is simply an averaging technique to reduce noise—it is not required. The more general approach is based on values of single pixels.

First, an on-axis reference image was captured with the target at the center of the image. Light from the target was unpolarized. FIG. 25 shows a close-up image. MATLAB was used to mark the target pixel and measure its RGB values. The target pixel was located in column 1536 (X) and row 1024 (Y) of the pixel image. The target pixel had measured R, G, and B values of 232, 181 and 124 respectively. The four pixels adjacent to the target pixel had mean measured R, G, and B values of 237.25, 182.5, and 127.5 respectively.

Then off-axis images were captured with the target near the right-hand edge of the image and still without a polarizing filter. The target's angle from the image center was $\theta=\theta_0=28.3°$. In this instance, the target pixel was located in column 2850 (X) and row 1024 (Y) of the pixel image. The mean measured R, G, and B values for the four pixels adjacent to this target pixel were now 209.75, 167.5, and 115.25 respectively.

Thereafter, a polarizing filter (a lens from polarized sunglasses) was placed between the target and the camera (while the target's angle from the image center was still $\theta=\theta_0=28.3°$). First the polarizing filter was oriented so that the light from the target was horizontally polarized, i.e., p-polarized, relative to the lens and focal plane optics. In this case the four pixels adjacent to the target pixel (i.e., X: 2850; Y: 1024) had mean measured R, G, and B values of 118, 82, and 44.25 respectively. Then the polarizing filter was oriented so that the light from the target was vertically polarized, which is s-polarized relative to the lens and focal plane optics. In this case the four pixels adjacent to the target pixel had mean measured R, G, and B values of 104.75, 80.75, and 34.75 respectively. As expected, the p-polarized values are higher than the s-polarized values: each interface in the camera reflects more s-polarized light than p-polarized light.

The following table shows an example calculation of the first two Mueller matrix elements from the measurements described above.

| H-pol and V-pol data from photos, pixels picked by spreadsheet w.r.t. target point | | | | | | | |
|---|---|---|---|---|---|---|---|
| | | | | cross_x | | cross_y | |
| Target point | | | | 2850 | | 1024 | |
| Delta_x | Delta_y | pixel_x | pixel_y | R | G | B | Intensity |
| Set 1: V-pol = s-pol | | | | | | | |
| −1 | −1 | 2849 | 1023 | 104 | 81 | 37 | 74.00 |
| −1 | 1 | 2849 | 1025 | 107 | 80 | 35 | 74.00 |
| 1 | −1 | 2851 | 1023 | 105 | 83 | 36 | 74.67 |
| 1 | 1 | 2851 | 1025 | 103 | 79 | 31 | 71.00 |
| s-pol-mean | | | Mean | 104.75 | 80.75 | 34.75 | 73.42 |
| Set2: H-pol = p-pol | | | | | | | |
| −1 | −1 | 2849 | 1023 | 120 | 82 | 45 | 82.33 |
| −1 | 1 | 2849 | 1025 | 117 | 82 | 42 | 80.33 |
| 1 | −1 | 2851 | 1023 | 117 | 81 | 45 | 81.00 |
| 1 | 1 | 2851 | 1025 | 118 | 83 | 45 | 82.00 |
| p-pol-mean | | | Mean | 118 | 82 | 44.25 | 81.42 |
| Set 3: unpol | | | | | | | |
| −1 | −1 | 2849 | 1023 | 210 | 167 | 116 | 164.33 |
| −1 | 1 | 2849 | 1025 | 207 | 168 | 113 | 162.67 |
| 1 | −1 | 2851 | 1023 | 211 | 165 | 116 | 164.00 |
| 1 | 1 | 2851 | 1025 | 211 | 170 | 116 | 165.67 |
| unpol-mean | | | Mean | 209.75 | 167.5 | 115.25 | 164.17 |
| Set 4: unpol on-axis | | | | | | | |
| −1 | −1 | 1562 | 1029 | 238 | 183 | 127 | 182.67 |
| −1 | 1 | 1562 | 1031 | 238 | 183 | 129 | 183.33 |

-continued

| H-pol and V-pol data from photos, pixels picked by spreadsheet w.r.t. target point | | | | | | | |
|---|---|---|---|---|---|---|---|
| 1 | −1 | 1564 | 1029 | 235 | 183 | 126 | 181.33 |
| 1 | 1 | 1564 | 1031 | 238 | 181 | 128 | 182.33 |
| on-axis-mean | | | Mean | 237.25 | 182.5 | 127.5 | 182.42 |
| Ratios | | | | | | | |
| | | | H/V | 1.126 | 1.015 | 1.273 | 1.109 |
| | | | U/H | 1.778 | 2.043 | 2.605 | 2.016 |
| | | | U/V | 2.002 | 2.074 | 3.317 | 2.236 |
| | | | on-axis/U | 1.131 | 1.090 | 1.106 | 1.111 |
| Mueller elements | | | | | | | |
| First (11, 22) | | | | 0.8841 | 0.9178 | 0.9039 | 0.899954 |
| Polarizer neutral density | | | | 0.531 | 0.4858 | 0.3427 | 0.471574 |
| Second (21, 12) | | | | 0.0526 | 0.007 | 0.1087 | 0.046499 |

The "target point" line in the table specifies the off-axis pixel coordinates of the visual target (the on-axis center of the focal plane was at 1536 and 1024). Each set of measurements in the table comprises four pixels diagonally adjacent to the target pixel. The columns labeled R, G, and B show measured pixel values for each color; the "Intensity" column is the average of those values. The mean and the median for each color and for the intensity are shown in the two lines immediately below each set of data. The line third from bottom shows the first Mueller element ($A_{11}$) calculated from the mean pixel value for each color and for the total intensity. The bottom line shows the second Mueller element ($A_{12}$) for each.

The data show a relatively strong intensity ratio for horizontal to vertical polarization in the red and blue bands, but a relatively weak ratio in the green band. This is likely because the anti-reflection coating of the lens is optimized to reduce reflection in green light, the band where human eyesight is most sensitive. Since the methodology disclosed herein relies on unequal reflection to induce polarization, minimal reflection in the green band corresponds to minimal polarization in the same band. The second Mueller element in the green band is shaded to indicate that polarization measurements in the green band at this value of θ may not be reliable.

The example includes calculations of the intensity coefficient of the polarizing filter as in Eq. (22). One coefficient for each color is shown in the line in the table labeled "polarizer neutral density".

The camera used in the foregoing experiment had a focal plane array 22.7 mm wide and 15.1 mm high. The lens focal length was set to 18 mm. The target point was 28.3° horizontally from the center, i.e., θ=28.3°.

In the above-described experiment, measurements for a single value of θ were taken. A typical application uses similar measurements at multiple values of θ. The resulting Mueller matrix values are stored in a lookup table or are used to curve-fit an equation that can be used to estimate the Mueller matrix values at any angle. These Mueller matrices constitute a characterization of the polarizing power of the camera.

Method for Using a Characterized Camera

Once the polarizing power of a camera has been characterized, that camera can be used to capture images from scenes containing unknown targets. A method in accordance with one embodiment comprises the following steps:

Step 1: Set Up Camera.

Set up of the camera includes installing the camera and related gear in such a way that the camera can view the same target object with different lens orientations, which typically correspond to different positions on the CCD. This may include attaching the camera to a pan/tilt mount, e.g., in a factory, or attaching it to an aircraft or other vehicle.

Step 2: Capture Images.

Capture multiple (e.g., three) images using the same incidence angle θ and various camera orientation angles (e.g., φ=0°, 45° and 90°). For each image captured at different orientations, the lens will project an image of a point on the target onto a corresponding position on the CCD chip. The goal is to capture the same scene with similar incidence angles (e.g., 30° from the center), but different tilt orientations. In cases where the camera does not rotate about the camera-to-target axis, this goal is equivalent to capturing the scene on different parts of the CCD that are at the same angle from the center. To measure the first three Stokes parameters (which fully characterize linear polarization), the target is imaged at the different angular positions about the optical axis, ideally at 0°, 90°, and either 45° or 135°.

The camera may be mounted on a pan/tilt mount mechanism. In a factory application, a typical embodiment uses an automated pan/tilt mount or gimbal to orient the camera as described above while images are acquired. In a typical airborne application with a gimbal mount, the gimbal orients the camera while images are being acquired. In airborne cases without a gimbal, or where the gimbal is ineffective, the operator or flight control computer maneuvers the aircraft, spacecraft, or other vehicle to orient the camera to different angles for image acquisition.

Ninth Embodiment

As previously discussed, FIGS. 4A and 4B are top and side views of an idealized fixed-wing aircraft 20 having a single downward-facing camera 16 fixedly mounted thereto and a polarizing filter 18 fixed to the camera. In the case where the polarizing power of the camera has been characterized as described above, the polarizing filter can be omitted. In that case. In the configuration shown in FIGS. 4A and 4B, the camera 16 faces downward when the aircraft is in level flight.

Figure 26:
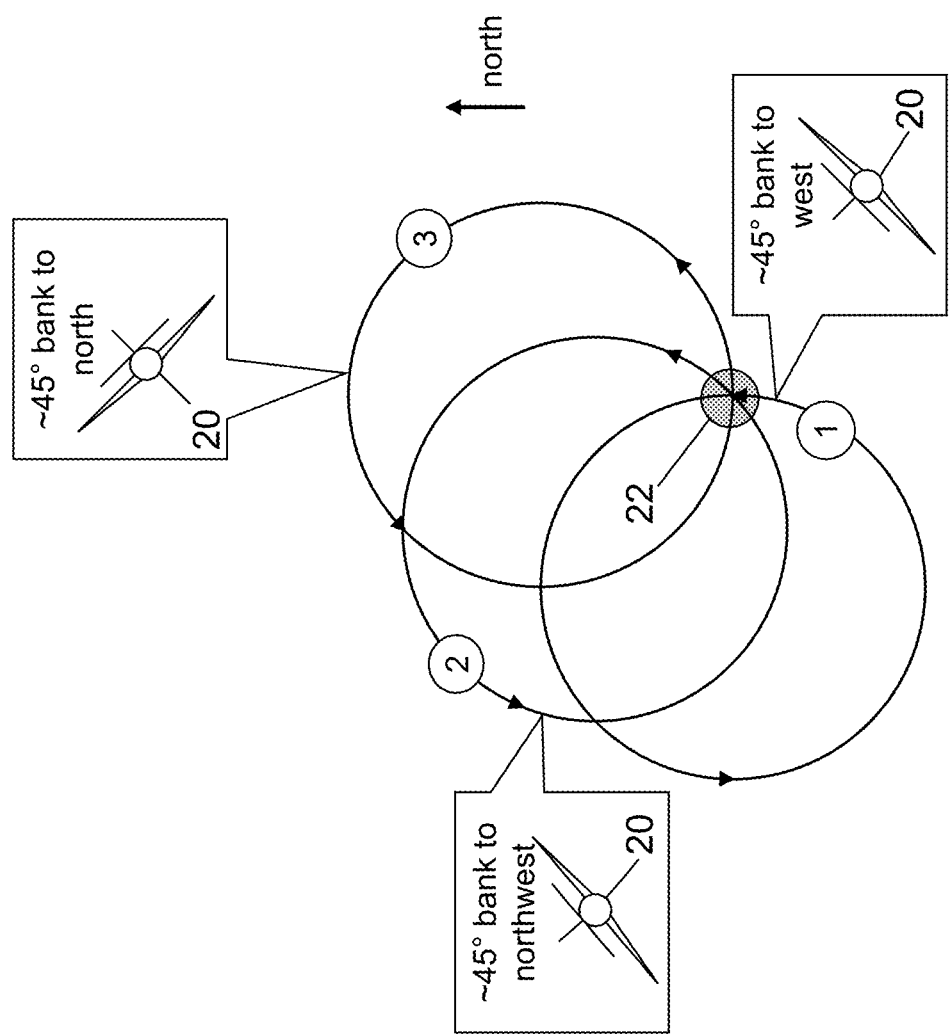
FIG. 26 is a diagram showing three loops of a flight path for a fixed-wing aircraft of the type shown in FIGS. 4A and 4B, except that the polarizing filter has been removed from the fixed downward-facing camera. The aircraft performs three maneuvers to bank the camera at bank angles of 45° west, 45° northwest, and 45° north of level while flying directly over a target.

FIG. 26 shows a flight path for a fixed-wing aircraft 20 of the type shown in FIGS. 4A and 4B except that the polarizing filter has been omitted. When a characterized camera is onboard, the aircraft 20 can acquire polarimetric data from a target 22 by making three steep turns at the same bank angle $\theta_0$. (For a downward-pointing camera on an aircraft in level flight, bank angle is identical to incidence angle θ.) The successive turns are indicated in FIG. 26 by encircled numbers 1, 2 and 3 respectively. The camera captures an image in the same position directly above the target during each of the three turns. In turn number 1, the camera is tipped to the west when it captures the image; in turn number 2, the camera is tipped to the northwest when it captures the image; and in turn number 3, it is tipped to the north when it captures the image. These correspond to θ=0°, 45°, and 90°.

An airplane with a fixed forward-facing camera can acquire images at θ=−45°, 0°, and 45° by momentarily yawing and pitching up or down about 32° while taking photographs. An airplane with a fixed side-facing camera can acquire images at θ=−45°, 0°, and 45° by yawing and rolling left and right about 32° while taking photographs.

Tenth Embodiment

A hovering rotorcraft may acquire a similar set of images, with the aircraft and camera tilted at the same angles, without leaving its position above the target. Instead, the rotorcraft can roll and pitch by moving side to side or forward and back.

Eleventh Embodiment

A spacecraft may acquire similar images by reorienting itself on successive orbital passes above the target.

Step 3: Compare Images and Determine Polarization

In the case of airborne vehicles, the captured images can be transmitted via a wireless communication channel to an antenna on the ground for processing by a computer on the ground or the captured images can be transferred directly to an onboard computer. The images are transferred to a computer that uses the measured intensity versus position to determine the Stokes vector $S_x$ of the scene:

$$S_x = \begin{bmatrix} I_x \\ Q_x \\ U_x \\ 0 \end{bmatrix} \quad (23)$$

The coordinate system of this vector is discussed below.

In accordance with one known technique, one might measure Stokes parameters at the output of the system, e.g., $Q_{out}=Int_0-Int_{90}$, $U_{out}=Int_{45}-Int_{135}$. One would concatenate these into an output Stokes vector, multiply that vector by the inverse of the Mueller matrix, and get the input Stokes vector $S_x$ of light from the target.

The polarimetric data acquisition technique disclosed herein works differently. The camera can only measure total intensity $I(\theta,\phi)$, not Q and U, at each orientation. Therefore, a different method is used to compute $S_x$. For the discussion of the method set forth below, it will be assumed that all three images are taken with the same incidence angle $\theta_0$, but the orientation of θ about the axis to the target varies in integer multiples of 45°. Also, a hypothetical beam of light that is 100% horizontally polarized in a selected reference system will be referred to. No such light actually exists; it is introduced for the purpose of helping the reader understand the coordinate system and the effect of reorienting the camera.

θ=θ$_0$, Define ϕ=0: Q=1

One image is picked to define a reference system such that ϕ=0 for the selected image. Hypothetical light that is 100% polarized horizontally in this reference system has Stokes parameter Q=1 and Stokes parameter U=0; this hypothetical light is p-polarized relative to the center of the lens. This reference system defines the input Stokes vector as in Eq. (23), and it determines measured intensity in the image as in Eq. (24):

$$\begin{bmatrix} I_{\theta p} \\ 0 \\ 0 \\ 0 \end{bmatrix} = \begin{pmatrix} A_{11} & A_{12} & 0 & 0 \\ 0 & 0 & 0 & 0 \\ 0 & 0 & 0 & 0 \\ 0 & 0 & 0 & 0 \end{pmatrix} \begin{bmatrix} I_x \\ Q_x \\ U_x \\ 0 \end{bmatrix} \quad (24)$$

This relates $I_{\theta p}$ to $A_{11}$ and $A_{12}$ thus:

$$I_{\theta p}=A_{11}I_x+A_{12}Q_x \quad (25)$$

θ=θ$_0$, ϕ=90°: H-Pol/p-Pol Becomes V-Pol/s-Pol: Q=−1

A second image is used where the camera is tipped to achieve the same incidence angle $\theta_0$ for the target, but the camera is rotated to ϕ=90° about the axis to the target, measured in the same reference system as the image with ϕ=0°. Relative to the lens's ability to transmit light, the input polarization has rotated by 90°. Hypothetical light that is 100% polarized horizontally in the reference system has Stokes parameter Q=−1 and Stokes parameter U=0. This has the effect of swapping horizontal and vertical polarization, so the effective Stokes vector into the camera is as shown at the far right in Eq. (26):

$$\begin{bmatrix} I_{\theta s} \\ 0 \\ 0 \\ 0 \end{bmatrix} = \begin{pmatrix} A_{11} & A_{12} & 0 & 0 \\ 0 & 0 & 0 & 0 \\ 0 & 0 & 0 & 0 \\ 0 & 0 & 0 & 0 \end{pmatrix} \begin{bmatrix} I_x \\ -Q_x \\ U_x \\ 0 \end{bmatrix} \quad (26)$$

This relates $I_{\theta s}$ to $A_{11}$ and $A_{12}$ thus:

$$I_{\theta s}=A_{11}I_x-A_{12}Q_x \quad (27)$$

θ=θ$_0$, ϕ=45°: 45°-Pol Becomes H-Pol/p-Pol: U=1

A third image is used where the camera is tipped to achieve the same incidence angle $\theta_0$ for the target, but the camera is rotated to ϕ=45° about the axis to the target. Relative to the lens's ability to transmit light, the input polarization has rotated by 45°. Hypothetical light that is 100% polarized horizontally in the reference system has Stokes parameter Q=0 and Stokes parameter U=1. This has the effect of swapping H-pol and 45°-pol (Q and U, respectively, in the Stokes vector), so the effective Stokes vector into the camera is shown at the far right in Eq. (28):

$$\begin{bmatrix} I_{\theta 45} \\ 0 \\ 0 \\ 0 \end{bmatrix} = \begin{pmatrix} A_{11} & A_{12} & 0 & 0 \\ 0 & 0 & 0 & 0 \\ 0 & 0 & 0 & 0 \\ 0 & 0 & 0 & 0 \end{pmatrix} \begin{bmatrix} I_x \\ U_x \\ Q_x \\ 0 \end{bmatrix} \quad (24)$$

This relates $I_{\theta 45}$ to $A_{11}$ and $A_{12}$ thus:

$$I_{\theta 45}=A_{11}I_x+A_{12}U_x \quad (29)$$

Solve for Input Stokes Vector

Given measurements of $I_{\theta p}$, $I_{\theta p}$, and $I_{\theta 45}$, the computer system programmed to process polarimetric data now has three equations (i.e., Eqs. (25), (27) and (29)) in three unknowns $I_x$, $Q_x$, and $U_x$. Equation (25) can be added to Eq. (27) to yield:

$$I_{\theta p}+I_{\theta s}=2A_{11}I_x \quad (30)$$

which is rearranged to get $I_x$:

$$I_x = \frac{I_{\theta p} + I_{\theta s}}{2A_{11}} \quad (31)$$

One can substitute this into Eq. (30) to get Eq. (32):

$$I_{\theta s} = A_{11}\frac{I_{\theta p} + I_{\theta s}}{2A_{11}} - A_{12}Q_x \quad (32)$$

Which can be rearranged to get $Q_x$ as in Eq. (33):

$$Q_x = \frac{-\left(I_{\theta s} - \frac{I_{\theta p} + I_{\theta s}}{2}\right)}{A_{12}} \quad (33)$$

One can also substitute Eq. (31) into Eq. (29) to get Eq. (34):

$$I_{\theta 45} = A_{11}\frac{I_{\theta p} + I_{\theta s}}{2A_{11}} + A_{12}U_x \quad (34)$$

which can be rearranged to get $U_x$ as follows:

$$U_x = \frac{\left(I_{\theta 45} - \frac{I_{\theta p} + I_{\theta s}}{2}\right)}{A_{12}} \quad (35)$$

This gives the complete three-element Stokes vector $S_x$ defined in Eq. (23).

Using the foregoing equations, Stokes parameters can be calculated for each color (R, G, B) and for overall intensity.

The foregoing method was applied using the measurements from the calibration example. Those measurements did not include any images with $\phi = 45°$, so the $U_x$ component could not be calculated, but the other calculations confirmed that the process described above leads to the correct values of $I_x$ and $Q_x$, i.e., 1 and 1, the reference values used for calibration.

Figure 27:
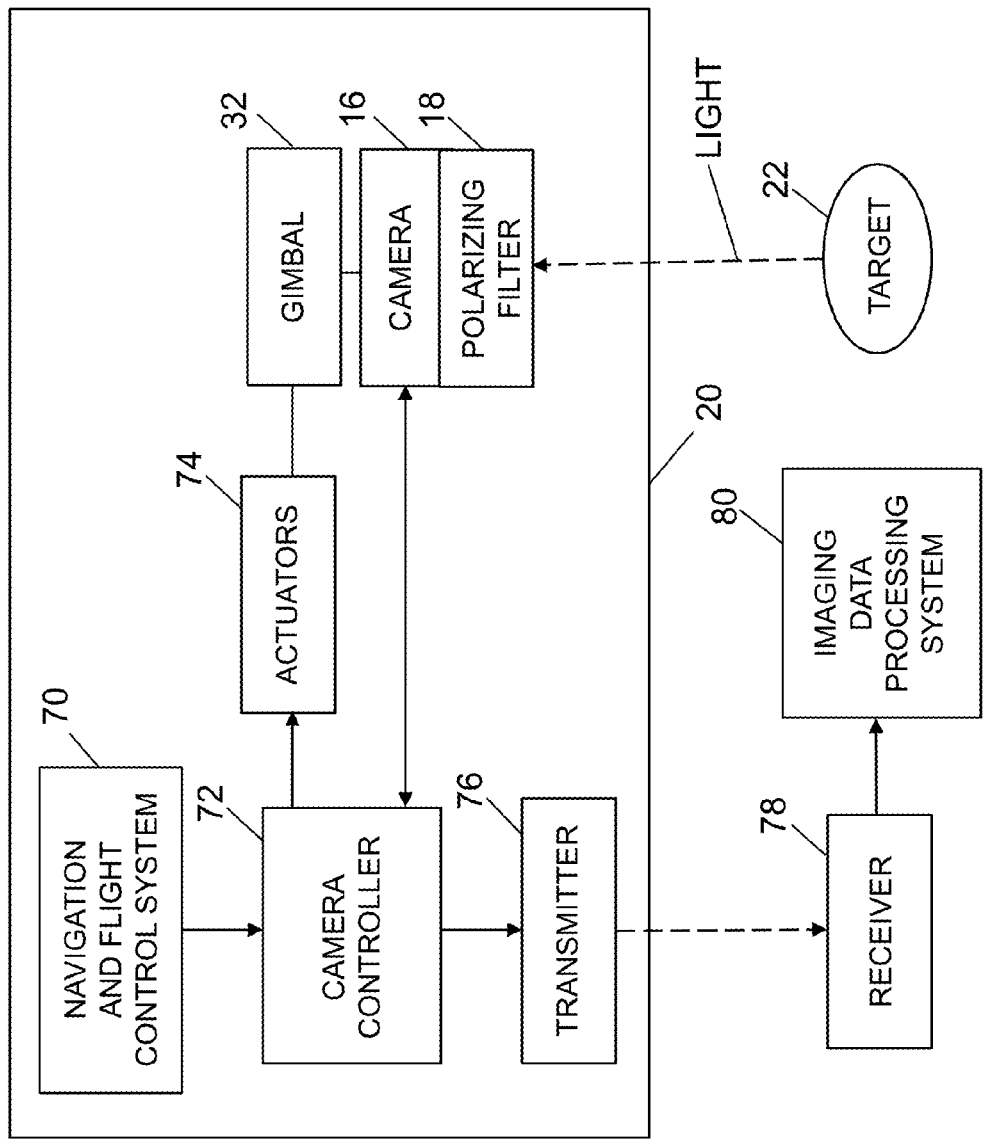
FIG. 27 is a block diagram identifying major components of a polarimetric data acquisition system in accordance with one embodiment.

FIG. 27 is a block diagram identifying major components of a system for acquiring polarization values for an imaged target 22 in accordance with one embodiment. The system comprises: an aircraft 20; an onboard navigation and control system 70 capable of flying to a three-dimensional position (e.g., longitude, latitude and altitude) and later returning the aircraft to approximately the same position at least twice, and also capable of measuring the aircraft orientation at the position and setting the aircraft in a different selected orientation when it returns to the same position; an onboard camera 16 mounted to a gimbal 32; actuators 74 coupled to the gimbal 32 for changing the orientation of the camera relative to the aircraft 20; an onboard linear polarizing filter 18 having a known, fixed orientation with respect to the camera 16; an onboard camera control system 72 capable of controlling the actuators 74 for orienting the camera 16 to any one of a plurality of selected orientations, controlling the camera 16 to capture images when the aircraft arrives at the selected position with one of the selected orientations, and then receiving the imaging data from the camera 16; an onboard transmitter 76 coupled to the camera control system 72 for transmitting the imaging data to a ground station; a receiver 78 at the ground station for receiving the transmitted imaging data; and an imaging data processing computer 80 (on the ground) programmed to register the images and compute polarization values for the imaged target 22.

The camera control system 72 may comprise a computer having hardware and software. The camera control software comprises: a database containing target position information; a first program for controlling the actuators 74 to change the state of the gimbal 32 and then activating the camera 16 in dependence on current aircraft position information (i.e., current aircraft position and orientation) received from the navigation and flight control system 70 during the data acquisition mission and stored target position information; and a second program for receiving imaging data from the camera 16 and outputting it in a suitable format for downloading by the transmitter 76.

The imaging data processing computer 80 may also comprise hardware and software. The imaging data processing software comprises a first program for registering the captured images and a second program for computing polarization values for the imaged target 22.

Alternatively, the camera 16 could be fixedly mounted to the aircraft 20, thereby eliminating the need for gimbal 32 and actuators 74. In accordance with further alternative embodiments, the polarizing filter 18 can be omitted and/or the computer 80 could be located onboard the aircraft 20 (in which case the transmitter 76 would also transmit processed data to the ground station).

Additional Embodiments

The polarimetric data acquisition system can be embodied many ways. Additional examples include at least the following.

(1) Characterize the camera's Mueller matrix, not just as a function of angle, but also as a function of aperture. A relatively large aperture allows light to pass through sections of lens surface at different angles of incidence.

(2) Characterize a camera's CCD separately from its lenses, so users can combine CCDs and lenses in various ways without characterizing each combination. Two optical elements used in series, such as a lens and a CCD, are mathematically represented by successive matrix multiplication using their Mueller matrices, e.g., $S_2 = M_{CCD} (M_{lens} S_1)$. If both Mueller matrices are characterized separately, then the input Stokes vector is calculated by inverting both matrices and multiplying them in reverse order: $S_1 = M_{lens}^{-1} (M_{CCD}^{-1} S_2)$.

(3) Capture images using $\phi$ angles that are not integer multiples of 45° and/or $\theta$ angles that vary between images. These embodiments rely on more tedious and more complicated algebra than the approach described by Eqs. (28) through (35), but the derivation and the method would be clear to skilled persons who have learned from the teachings above.

(4) Apply the embodiment above (using $\phi$ angles other than 0/45/90° and non-identical values of angle $\theta$) to calculate the input Stokes vector $S_x$ for multiple pixel-sized points in a scene (possibly every pixel-sized point in the scene) using as few as three images that cover the scene. This produces a complete polarimetry image—degree and angle of polarization at every point in the scene—without a filter.

(5) Attach the camera to a UAV, manned aircraft, rotorcraft, spacecraft, surface vessel, or UUV.

(6) Use a camera and lens that work in the ultraviolet, visual, infrared, or terahertz bands.

Although various embodiments have been described hereinabove in terms of aircraft, in other embodiments the platform may comprise: (a) spacecraft that reorient themselves between passes over a target; or (b) boats or underwater vehicles taking underwater photos. Embodiments that use a gimbal need not even be in a vehicle: gimbal-mounted cameras in a ground vehicle or in fixed installations can use gimbal movement to orient a camera and the filter attached to it. This could even be applied to a handheld camera, like a smart phone, with a polarizing filter attached in front of the lens. Since many smart phones include accelerometers or other means to sense orientation, and they have processors and communication links, a smart phone with a polarizing filter should be as capable as a camera-equipped airplane to acquire polarized images and use them to produce polarimetry measurements.

In addition, although the embodiments described above refer to a CCD, the teachings disclosed herein may also be used with other electronic focal plane technologies or with a film camera and a scanning digitizer.

While systems for polarimetric data acquisition have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order or in the order in which they are recited. Nor should they be construed to exclude any portions of two or more steps being performed concurrently or alternatingly.

As used in this disclosure, the term "location" includes both position and orientation.

The invention claimed is:

1. A method for determining a polarization of a scene, comprising:
    (a) placing a linear polarizing filter in a field of view of a camera comprising a lens and an array of sensors;
    (b) successively locating the camera and the linear polarizing filter in proximity to a single position, but at three different orientations for each of which a particular point in a scene is within the field of view of the camera;
    (c) capturing first through third filtered images while the camera and the linear polarizing filter are at the three different orientations respectively;
    (d) transferring first through third sets of imaging data respectively representing the first through third filtered images from the camera to a computer system; and
    (e) computing a polarization of at least said particular point in the scene from the first through third sets of imaging data.

2. The method as recited in claim 1, further comprising mounting the camera and the linear polarizing filter on a vehicle, wherein step (b) comprises maneuvering the vehicle.

3. The method as recited in claim 2, wherein the vehicle is an unmanned vehicle.

4. The method as recited in claim 1, wherein respective angles about a line of sight of the camera relative to a reference for a first two of the three different orientations differ by an odd integer multiple of 45° and respective angles about the line of sight of the camera relative to a reference for a second two of the three different orientations differ by 90°.

5. The method as recited in claim 1, further comprising registering the first through third sets of imaging data with respect to each other before performing step (e).

6. The method as recited in claim 1, wherein step (e) comprises computing Stokes parameters.

7. A system for acquiring images of a scene, comprising:
    an unmanned vehicle;
    a camera onboard said unmanned vehicle, said camera comprising a lens and an array of sensors;
    a first linear polarizing filter disposed in front of a first portion of said array of sensors and a second linear polarizing filter disposed in front of a second portion of said array of sensors, wherein one of said first and second linear polarizing filters is horizontally polarized and the other of said first and second linear polarizing filters is vertically polarized;
    an unmanned vehicle control system capable of controlling said unmanned vehicle to perform maneuvers, said unmanned vehicle control system comprising hardware and software, said software of said unmanned vehicle control system being configured to control said unmanned vehicle to position itself at or near a specified position for each of first, second and third occurrences and at first, second and third orientations which are different than each other, but which each place the scene within a field of view of said camera; and
    a camera control system disposed onboard said unmanned vehicle and capable of controlling said camera to capture images, said camera control system comprising hardware and software, said software of said camera control system being configured to control said camera to capture first, second and third images of a target scene during said first, second and third occurrences respectively and then outputting first, second and third sets of imaging data respectively representing said first, second and third images.

8. The system as recited in claim 7, further comprising an imaging data processing system capable of processing imaging data, said imaging data processing system comprising hardware and software, said software of said imaging data processing system being configured to register said first, second and third sets of imaging data with respect to each other and compute polarization values for the imaged scene.

9. The system as recited in claim 8, wherein said polarization values comprise Stokes parameters.

10. The system as recited in claim 7, wherein said unmanned vehicle comprises a window, further comprising a gimbal mounted to said unmanned vehicle, said camera being coupled to said gimbal, and said first linear polarizing filter being attached to said window.

11. The system as recited in claim 7, further comprising a gimbal mounted to said unmanned vehicle, wherein said camera is rotatably coupled to said gimbal for rotation about an axis that is parallel to an optical axis of the camera, and said first linear polarizing filter is attached to said camera.

12. The system as recited in claim 8, wherein respective angles about a line of sight of said camera relative to a reference for at least two of said first through third orientations differ by an integer multiple of 45°.

13. A method for determining a polarization of a scene, comprising:
(a) characterizing a polarizing power of a camera comprising a lens and an array of sensors;
(b) successively locating the camera in proximity to a single position, but at three different orientations for each of which a particular point in a scene is within a field of view of the camera;
(c) capturing first through third images while the camera is at the three different orientations respectively;
(d) transferring first, second and third sets of imaging data representing the first through third captured images from the camera to a computer system; and
(e) computing a polarization of at least said particular point in the scene from the first, second and third sets of imaging data,
wherein step (a) comprises determining first and second Mueller matrix elements.

14. A method for determining a polarization of a scene, comprising:
(a) characterizing a polarizing power of a camera comprising a lens and an array of sensors;
(b) successively locating the camera in proximity to a single position, but at three different orientations for each of which a particular point in a scene is within a field of view of the camera;
(c) capturing first through third images while the camera is at the three different orientations respectively;
(d) transferring first, second and third sets of imaging data representing the first through third captured images from the camera to a computer system; and
(e) computing a polarization of at least said particular point in the scene from the first, second and third sets of imaging data,
wherein step (a) comprises determining at least one of a first Mueller matrix element and a second Mueller matrix element for at least two positions on the array of sensors, said positions corresponding to different incidence angles for light passing through a center of the lens.

15. A method for determining a polarization of a scene, comprising:
(a) characterizing a polarizing power of a camera comprising a lens and an array of sensors;
(b) successively locating the camera in proximity to a single position, but at three different orientations for each of which a particular point in a scene is within a field of view of the camera;
(c) capturing first through third images while the camera is at the three different orientations respectively;
(d) transferring first, second and third sets of imaging data representing the first through third captured images from the camera to a computer system; and
(e) computing a polarization of at least said particular point in the scene from the first, second and third sets of imaging data,
wherein at least one of the three different orientations is chosen so that the scene falls at a position near an edge or a corner of the array of sensors.

16. The method as recited in claim 13, further comprising mounting the camera on a vehicle, wherein step (b) comprises maneuvering the vehicle.

17. The method as recited in claim 13, wherein respective angles of the camera relative to a reference for at least two of the three different orientations differ by an integer multiple of 45°.

18. The method as recited in claim 13, further comprising registering the first through third sets of imaging data with respect to each other before performing step (e).

19. A method for measuring polarization in light from a scene, comprising:
(a) capturing successive images of a scene using a camera positioned in proximity to a single position and oriented at successive different orientation angles, wherein a set of matrices characterizing a polarizing power of the camera at different angles of incidence and different angles of orientation are known and there is no polarizing filter between an array of sensors of the camera and the scene;
(b) registering the captured images with respect to each other; and
(c) computing polarimetry values for light from at least one point of interest in the scene based on the registered captured images and the known matrices,
wherein steps (b) and (c) are performed using a computer system comprising hardware and software.

20. The method as recited in claim 19, wherein the matrix is a Mueller matrix and the computed polarimetry values are Stokes parameters.

21. The method as recited in claim 19, wherein the polarimetry values which are included comprise intensity and angle of polarization.

22. The method as recited in claim 19, wherein the scene is imaged at three different orientation angles of the camera, said different orientation angles being disposed at 45-degree angular intervals.

23. The method as recited in claim 19, further comprising mounting the camera on a vehicle and maneuvering the vehicle to achieve the different camera orientations.

24. An empirical method for characterizing a polarizing power of a camera having a lens and a focal plane array of sensors at a specified angle of incidence of impinging light and a specified orientation angle, the method comprising:
(a) providing a target that emits unpolarized light;
(b) aiming the camera at the target without an intervening polarizing filter and with a portion of the target projected onto at least one sensor in a center of the focal plane array;
(c) capturing a reference image while the camera is in the state described in step (b);
(d) measuring a reference pixel value for a pixel in the reference image which corresponds to a sensor in the center of the focal plane array;
(e) aiming the camera at the target without an intervening polarizing filter and with a portion of the target projected onto at least one sensor near an edge or corner of the focal plane array;
(f) capturing a first image while the camera is in the state described in step (e);
(g) measuring a first pixel value for a pixel in the first image which corresponds to a sensor near the edge or corner of the focal plane array;
(h) placing a linear polarizing filter between the camera and the target;
(i) capturing a second image while the camera is in the state described in steps (e) and (h);

(j) measuring a second pixel value for a pixel in the second image which corresponds to the sensor near the edge or corner of the focal plane array;

(k) calculating a first element of a matrix based on the set of reference pixel values and the first set of pixel values; and (l) calculating a second element of the matrix based on at least the reference pixel value and the second pixel value.

25. The empirical method as recited in claim 24, wherein step (h) further comprises orienting the linear polarizing filter with its polarization axis parallel to one of a surface plane at the center of the camera lens or an incident plane at the center of the camera lens.

26. The empirical method as recited in claim 24, further comprising:

(m) rotating the linear polarizing filter by 90°;

(n) capturing a third image while the camera is in the state described in steps (e) and (m); and (o) measuring a third pixel value for a pixel in the third image which corresponds to the sensor near the edge or corner of the focal plane array, wherein in step (l), the second element of the matrix is calculated based on at least the reference pixel value and the second and third pixel values.

27. The empirical method as recited in claim 26, further comprising computing an intensity coefficient based on the reference pixel value and the second and third pixel values.

28. The empirical method as recited in claim 27, wherein in step (l), calculation of the second element of the matrix is further based on the intensity coefficient.

* * * * *